United States Patent
Afkhami et al.

(10) Patent No.: US 9,847,909 B2
(45) Date of Patent: Dec. 19, 2017

(54) NETWORK DEVICE WITH SHARED HARDWARE FOR MULTIPLE COMMUNICATION NETWORKS

(71) Applicant: QUALCOMM Incorporated, San Diego, CA (US)

(72) Inventors: Hassan Kaywan Afkhami, San Jose, CA (US); Purva Rameshchandra Rajkotia, Orlando, FL (US); Lawrence Winston Yonge, III, Summerfield, FL (US); Deniz Rende, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 14/864,375

(22) Filed: Sep. 24, 2015

(65) Prior Publication Data
US 2017/0093626 A1    Mar. 30, 2017

(51) Int. Cl.
| | | |
|---|---|---|
| *H04W 74/08* | (2009.01) | |
| *H04L 12/24* | (2006.01) | |
| *H04B 3/54* | (2006.01) | |
| *H04B 1/00* | (2006.01) | |
| *H04W 80/00* | (2009.01) | |
| *H04L 29/06* | (2006.01) | |

(Continued)

(52) U.S. Cl.
CPC ....... *H04L 41/0816* (2013.01); *H04B 1/0067* (2013.01); *H04B 3/542* (2013.01); *H04L 69/18* (2013.01); *H04W 80/00* (2013.01); *H04W 48/18* (2013.01); *H04W 52/0216* (2013.01); *H04W 74/04* (2013.01)

(58) Field of Classification Search
CPC .............. G05B 19/0241; G05B 19/414; G05B 19/31228; G05B 19/33273; G05B 19/34417; G06F 9/4405; H04W 74/08; H04W 74/0833; H04W 74/0841; H04W 74/085; H04W 74/0858; H04W 74/0866
See application file for complete search history.

(56) References Cited

U.S. PATENT DOCUMENTS 6,842,429 B1    1/2005  Shridhar et al.
7,546,140 B2 *  6/2009  Sinai ..................... H04W 88/06
                                                          455/552.1

(Continued)

OTHER PUBLICATIONS

"PCT Application No. PCT/US2016/48491 International Search Report", dated Nov. 17, 2016, 12 pages.

*Primary Examiner* — Alvin Zhu
(74) *Attorney, Agent, or Firm* — DeLizio Law, PLLC

(57) ABSTRACT

A network device may be configured for communication over multiple communication networks. In one example, a method for using a network device to communicate over multiple networks is disclosed. The method includes receiving a packet from a combined communication interface and determining that the packet is formatted according to a first communication protocol. In response to determining that the packet is formatted according to the first communication protocol, the method includes enabling a first component in a first digital signal processor (DSP) block of the network device to process the packet according to the first communication protocol, and disabling a second component of the first DSP block, wherein the second component is configured to process the packet according to a second communication protocol.

26 Claims, 11 Drawing Sheets

(51) Int. Cl.
*H04W 48/18* (2009.01)
*H04W 52/02* (2009.01)
*H04W 74/04* (2009.01)

(56) References Cited

U.S. PATENT DOCUMENTS

| | | |
|---|---|---|
| 8,072,912 B2 | 12/2011 | Ginzburg et al. |
| 8,612,595 B2 | 12/2013 | Zetterman et al. |
| 8,831,015 B2 | 9/2014 | Petrovic et al. |
| 8,855,120 B2 * | 10/2014 | Robbins ............... H04L 49/201 370/392 |
| 9,137,849 B1 * | 9/2015 | Wright ............... H04W 88/026 |
| 2003/0182495 A1 | 9/2003 | Chang et al. |
| 2005/0066045 A1 | 3/2005 | Johnson et al. |
| 2013/0163584 A1 * | 6/2013 | Jayaraman .......... H04L 65/1036 370/352 |
| 2013/0322417 A1 | 12/2013 | Kao |
| 2013/0343228 A1 | 12/2013 | Cohen et al. |
| 2017/0076293 A1 * | 3/2017 | Cage ............... G06Q 20/40145 |

* cited by examiner

NETWORK DEVICE WITH SHARED HARDWARE FOR MULTIPLE COMMUNICATION NETWORKS

BACKGROUND

Embodiments of this disclosure generally relate to the field of communications, and more particularly to operating a network device in multiple communication networks.

A network device may communicate data over multiple communication networks. Each communication network may use a different communication protocol, such as a wireless fidelity (Wi-Fi), Bluetooth, Ethernet, or Powerline Communication (PLC) protocol. Some network devices communicate via multiple communication protocols using duplicate hardware modules that process different communication protocols. For example, a network device may have a separate analog front end (AFE), a separate digital signal processor (DSP), a separate memory, and a separate network interface for processing each different communication protocol. A network device that has duplicate hardware components may be relatively large, expensive, and consume relatively large amounts of power.

SUMMARY

The described features generally relate to one or more systems, methods, and/or apparatuses for communicating over multiple networks using shared hardware. A method for using a network device to communicate over multiple networks is disclosed. The method includes receiving a packet from a combined communication interface and determining that the packet is formatted according to a first communication protocol. In response to determining that the packet is formatted according to the first communication protocol, the method includes enabling a first component in a first digital signal processor (DSP) block of the network device to process the packet according to the first communication protocol, and disabling a second component of the first DSP block, wherein the second component is configured to process the packet according to a second communication protocol. In some implementations, the first protocol is a PLC protocol and the second protocol is a Wi-Fi protocol.

A network device for communicating over multiple communication networks is disclosed. The network device may include a combined communication interface (CCI) configured to receive a packet over a first communication network and a second packet over a second communication network. The network device may further include a DSP block to process the first packet according to a first communication protocol and the second packet according to a second communication protocol. The network device may further include a DSP block selector to selectively enable/disable processing of packets according to the first protocol and/or processing of packets according to the second protocol.

A non-transitory computer-readable medium storing instructions for communication over multiple communication networks is also described. The instructions, when processed by a processor, may cause a network device to perform operations for processing communications from the multiple communication networks.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
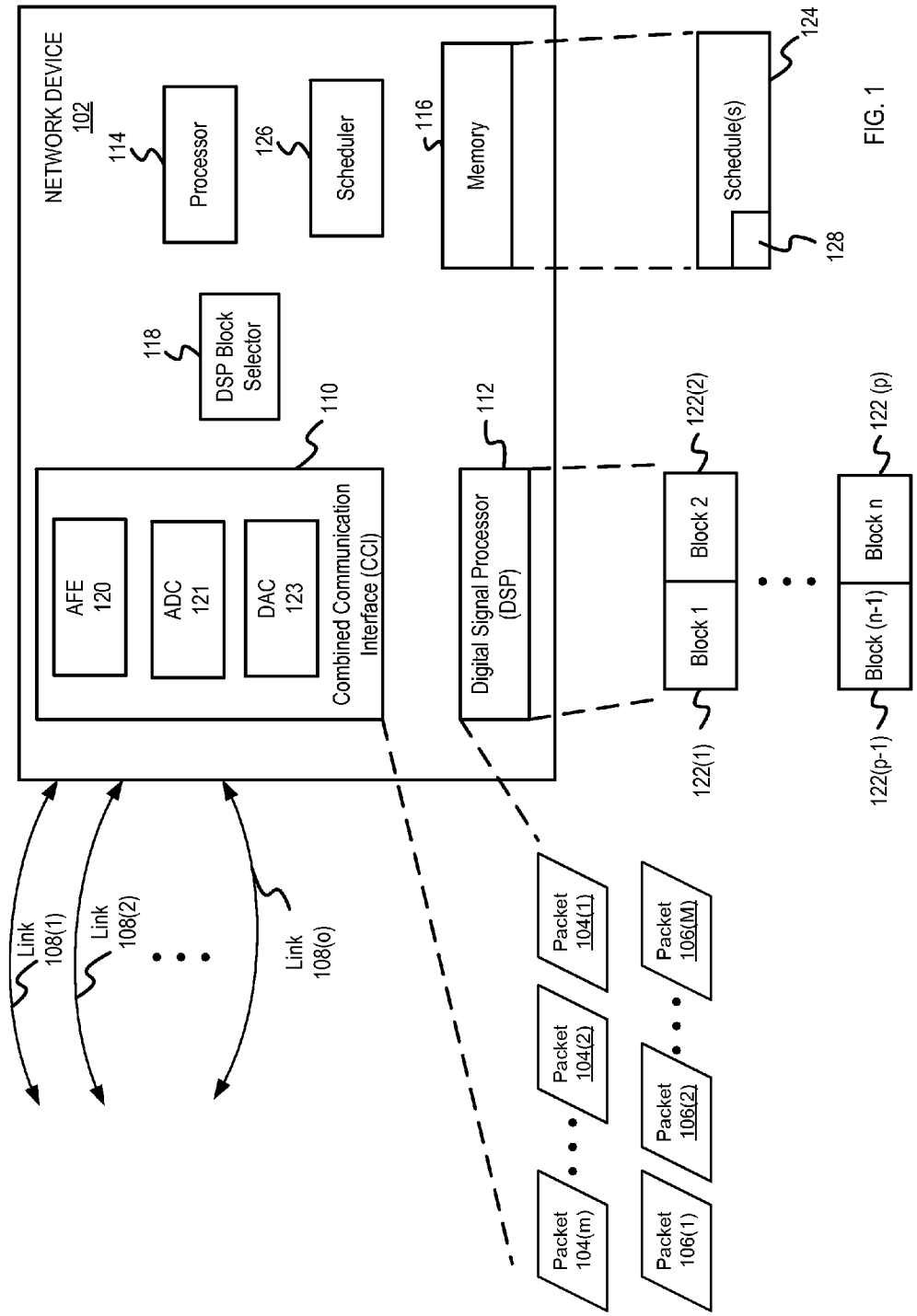
FIG. 1 is a diagram of an example network device for operating in multiple communication networks.

The description that follows includes exemplary systems, methods, techniques, instruction sequences and computer program products that embody techniques of this disclosure. However, it is understood that the described embodiments may be practiced without these specific details. For instance, some examples refer to operating in Wi-Fi and PLC communication networks. In other embodiments, the operations may be executed to operate in other types of networks that implement other suitable communication protocols (e.g., Ethernet, long-term evolution (LTE), 3G, 4G, etc.). In yet other embodiments, well-known instruction instances, protocols, structures, and techniques are not shown in detail to avoid obfuscating the description.

A network device (e.g., a modem) may communicate with other network devices via multiple communication networks. Each communication network may use a different communication protocol, such as a Wi-Fi, Bluetooth, Ethernet, or PLC communication protocol. As described herein, the network device may include one or more shared hardware modules that are configured to process communications formatted according to different communication protocols from different communication networks. For example, the hardware modules may include an AFE, memory, an Analog-to-Digital converter (ADC), a Digital-to-Analog converter (DAC), a DSP, a DSP block selector, a scheduler, interfaces, memory, and/or processor(s). Some embodiments utilize separate arrays of hardware modules, each array for processing communications formatted in a different communication protocol. Other embodiments include a single hardware module array configurable to process communications from multiple different communication protocols. Yet other embodiments may share one or more hardware module to process communications from multiple communication protocols. For example, a single AFE, a single DSP, a single processor and/or a single memory may be shared to process both Wi-Fi and PLC data.

A DSP may include a number of DSP blocks. The DSP blocks may include an automatic gain control (AGC) block, a timing recover block, an equalization block, etc. In some embodiments, one or more DSP blocks may be configured to process one of multiple communication protocols, while other DSP blocks may be dedicated to processing a single communication protocol. A DSP block may be used for processing different communication protocols by configuring parameters provided to the DSP block. For example, a DSP block may be re-configured between different communication protocols by changing certain parameter values of that DSP block. In another embodiment, a DSP block may include multiple components, each component configured for a particular communication protocol. In this embodiment, individual DSP block components may be enabled/disabled depending on the communication protocol being used.

A network device may determine which communication protocol is being used for the communication data based on processing the communication data, or based on a schedule. Details about determining communication protocols based on processing of communication data are described below with reference to FIGS. 1-6. Details about determining communication protocols based on a schedule are described below with reference to FIGS. 9 and 10.

In one embodiment, upon receiving communication data, a network device may determine which communication protocol is being used for the communication. In one implementation, all of the DSP blocks of a receive path may be selected based on the communication protocol being used. In another implementation, the first DSP block in the receive path is selected based on the communication protocol being used, and the remaining DSP blocks in the receive path are configured dynamically based on this selection.

When data is being transmitted, the DSP blocks of a transmit path may be configured based on the type of communication protocol to be used by the network device. In another implementation, the network device determines which communication protocol is being used based on a schedule that indicates the communication protocol for each transmission. The schedule may also indicate a time duration that the network device will spend communicating via each communication protocol. Various aspects of how the network device communicates via multiple communication protocols is further described below.

FIG. 1 is a diagram of an example network device for operating in multiple communication networks. The network device 102 includes a combined communication interface (CCI) 110, a DSP 112, a processor 114, a memory 116, a scheduler 126, and a DSP block selector 118. The CCI 110 includes an AFE 120, an ADC 121, and a DAC 123. The network device 102 may receive and transmit data over links 108(1)-108(o) using the CCI 110.

The AFE 120 of the CCI 110 receives and transmits data over each of the links 108 using analog signals. For example, the AFE 120 may receive a PLC signal via the link 108(1) and Wi-Fi signal via the link 108(2). In one implementation, the CCI 110 includes a separate AFE for each link, such as a separate AFE for communicating via link 108(1) and a separate AFE for communicating via link 108(2).

The AFE 120 propagates the analog signal to the ADC 121 to digitize the analog signal. The ADC 121 digitizes the analog signal and propagates corresponding packets 104(1)-104(m) to the DSP 112 for processing. Packets 104 may be encapsulated using frames and/or other techniques. In some embodiments, the CCI 110 does not determine the communication protocol for the received analog signal. For transmitting data, the DSP 112 performs propagation of packets 106(1)-106(m) to the CCI 110. The DAC 123 converts the packets 106 into a corresponding analog signal, which is then transmitted by the AFE 120 using one of the links 108.

The DSP 112 includes DSP blocks 122(1)-122(p). A subset of the DSP blocks 122 form a receive path that may be used to process communications that are received from the CCI 110. Another subset of DSP blocks 122 forms a transmit path that may process communications that are transmitted by the CCI 110. In one embodiment, the receive path does not share any DSP blocks with the transmit path. In another embodiment, at least one DSP block (e.g., an Inverse Fourier Transform (IFT) block) is shared between the transmit path and the receive path.

The DSP block selector 118 may determine a communication protocol of a packet based on processing of the data communication, as described below with reference to FIGS. 1-6. Alternatively, the DSP block selector 118 may determine the communication protocol of a packet based on a known schedule, as described below with reference to FIGS. 8 and 9.

In one embodiment, the receive path in the DSP 112 may include one or more of the following DSP blocks: an AGC block, an equalization block, a timing recovery block, a multiple-input-multiple-output (MIMO) singular value decomposition (SVD) block, a decoder block, a signal-to-noise ratio (SNR) estimation block, a jammer mitigation block, a windowing block, a time-tracking block, and/or others. The DSP blocks in the receive path will be further described below (see also FIG. 2).

In one embodiment, the transmit path in the DSP 112 may include one or more of the following DSP blocks: a beam-forming block, an interleaving and parsing block, a diversity copying block, a quadrature amplitude modulation (QAM) mapping block, an IFT block, an orthogonal frequency-division multiplexing (OFDM) modulation block, and/or others. The DSP blocks in the transmit path will be further described below, in the discussion of FIG. 3.

The discussion of FIG. 4 (below) describes how the DSP blocks 122 and other hardware modules in the network device 102 may be used for processing multiple communication protocols. For example, a receive path for the PLC communication protocol and a receive path for the Wi-Fi communication protocol may share one or more of the DSP blocks 122, the processor 114, and memory 116. In one embodiment, the receive paths for the PLC communication protocol and the Wi-Fi communication protocol may also share parts of the CCI 110.

The memory 116 may include a schedule 124. The schedule 124 may indicate when the network device 102 communicates on each of the links 108 using each of the communication protocols. For example, the schedule 124 may indicate that the network device 102 will be available to communicate, using the CCI 110, over the PLC communication protocol from time t=0, for 10 milliseconds (ms). The schedule 124 may indicate that the network device 102 will be available to communicate, using the CCI 110, over the Wi-Fi communication protocol from time t=10 ms to time t=15 ms. The schedule 124 may include a communication behavior 128. The communication behavior 128 may indicate how the network device 102 communicates on each of the links 108 during collision intervals. As described above with reference to FIGS. 9 and 10, during collision intervals, the network device 102 is scheduled to be available for communication over multiple communication protocols at the same time.

Figure 2:
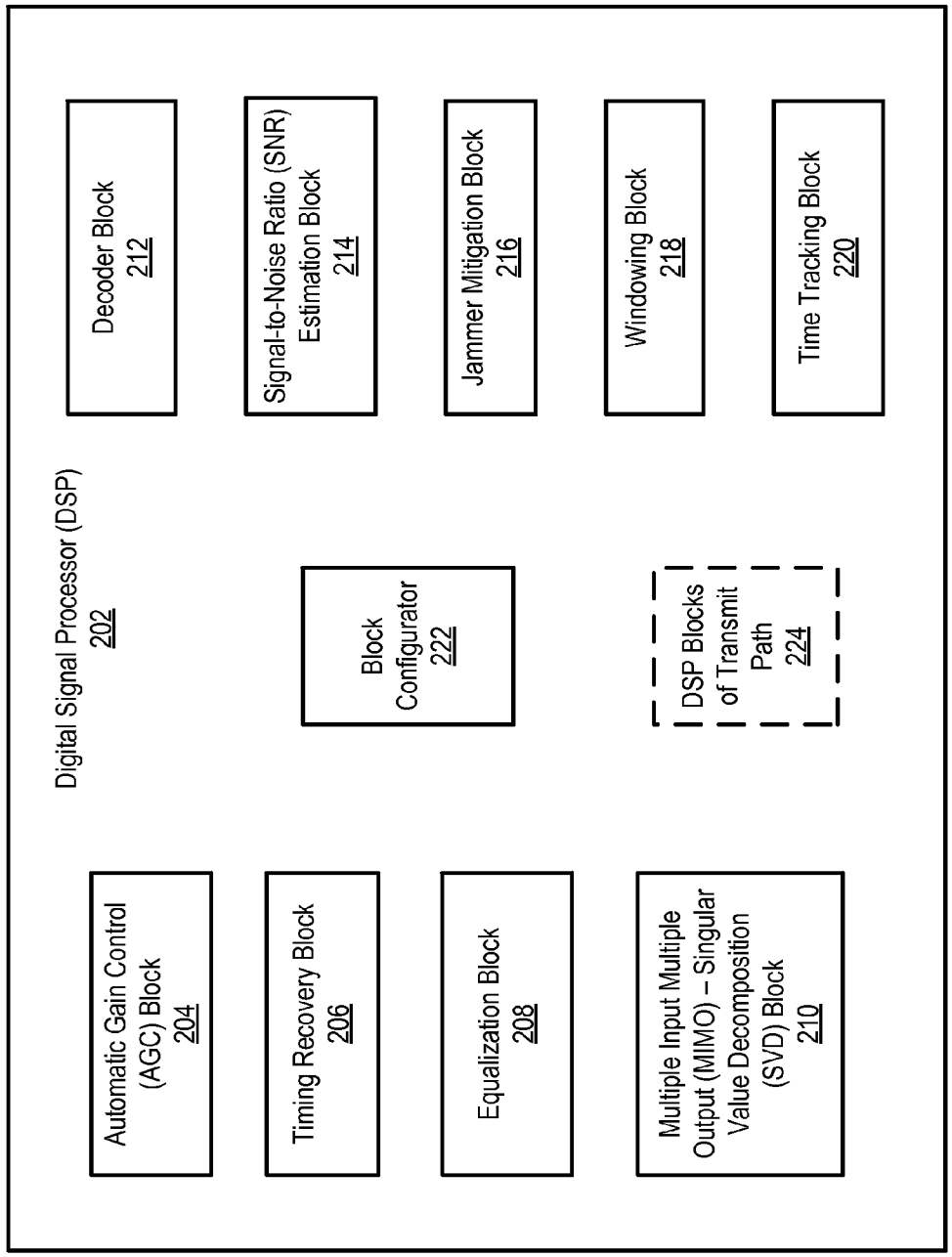
FIG. 2 is a diagram showing components of a digital signal processor used for processing received packets.

FIG. 2 is a diagram showing blocks of a digital signal processor used for receiving and processing packets. The DSP 202 may include various DSP blocks such as an AGC block 204, a timing recovery block 206, an equalization block 208, a MIMO SVD block 210, a decoder block 212, an SNR estimation block 214, a jammer mitigation block 216, a windowing block 218, and a time-tracking block 220. The DSP 202 may also include a block configurator 222 that configures one or more of the DSP blocks 204-220 for processing packets received from the CCI 110. The block configurator 222 may individually configure each of the DSP blocks 204-220 by parameterizing each of the DSP blocks 204-220 and/or by selectively enabling and disabling components of each of the DSP blocks 204-220. The DSP 202 may also include DSP blocks of the transmit path 224, as described with reference to FIG. 3. The DSP 202 may propagate processed packets to a Media Access Layer (MAC) (not shown in FIG. 2).

In one embodiment, the AGC block 204 and the timing recovery block 206 are the initial DSP blocks in a receive path. Thus, a packet is propagated from the CCI 110 to the AGC block 204. After the AGC block 204 processes the packet, the AGC block 204 propagates the processed packet to the timing recovery block 206.

In one embodiment, the network device may not determine the communication protocol of the received packet until the packet has been processed by the AGC block 204. After the network device determines the communication protocol of the received packet, the block configurator 222 may configure the remaining DSP blocks of the receive path based on the communication protocol. In other words, the block configurator 222 may determine one or more DSP blocks of the receive path for propagating the packet based on the determination of the communication protocol. The block configurator 222 may then configure the one or more DSP blocks of the receive path.

The AGC block 204 estimates gain of an analog signal received by the network device and may adjust the received gain of the received analog signal. The AGC block 204 may estimate the gain on a per packet basis, including the currently received packet as well as one or more previously processed packets of the same analog signal. For example, some of the DSP blocks in the receive path may be configured to process a packet having gain within a certain voltage range. The AGC block 204 may adjust the gain of a packet so that the data in the packet is within the expected voltage range. AGC block 204 may operate in similar fashion regardless of the communication protocol used. For example, the AGC block 204 may operate similarly when processing packets of either the Wi-Fi communication protocol or the PLC communication protocol.

The block configurator 222 may configure the AGC block 204 by setting a configuration parameter for each of the communication protocols. Setting configuration parameters may be referred to as "parameterizing." For example, the block configurator 222 may parameterize the AGC block 204 using a set of configuration parameters for processing a packet according to the PLC communication protocol. The block configurator 222 may parameterize the AGC block 204 using a different set of configuration parameters for processing a packet according to the Wi-Fi communication protocol.

The timing recovery block 206 processes packets of a received signal to determine the difference between the clock frequencies of the receiving and transmitting network devices. In general, each network device may communicate based on a predetermined clock frequency, which is generated locally by that network device. However, timing differences may occur between the clock frequencies of a network device that is transmitting an analog signal and a network device that is receiving the analog signal. For example, the clock frequency of the transmitting network device may be 100.00 MHz. However, the clock frequency of the receiving network device may be 100.01 MHz. The timing recovery block 206 determines that the difference between the two clock frequencies is 0.01 MHz.

The timing recovery block 206 may measure the phase difference using one of several techniques. In one embodiment, the network device receives signals based on OFDM in which data is encoded on multiple carrier frequencies. A packet of the received signal thus may include multiple symbols. The timing recovery block 206 may estimate a phase shift of each symbol in the packet and determine the difference of the two clock frequencies based on the phase shifts of the symbols in the packet.

The block configurator 222 may configure the timing recovery block 206 based on the communication protocol of the packet. The block configurator 222 may configure the timing recovery block 206 by enabling and disabling components of the timing recovery block 206. Enabling or disabling components of the DSP blocks may be referred to as block component selecting. For example, the block configurator 222 may enable a first component of the timing recovery block 206 in order to process a packet of a first communication protocol. The block configurator 222 may enable a second component of the timing recovery block 206 in order to process a packet of a second communication protocol. Block component selecting is discussed in more detail with reference to FIG. 4.

When configured for the Wi-Fi communication protocol, a network device may transmit packets that include one or more pilot carriers. The pilot carriers are part of the packet that carries fixed (e.g., predetermined, not data) symbols. The network device receiving the packet expects to receive the fixed symbols in the pilot carrier part of the packet. Upon receiving the packet with pilot carry, the timing recovery block 206 may determine a phase difference between the received fixed symbols and the expected fixed symbols. The timing recovery block 206 may then determine the phase difference between the clock frequencies of the receiving and transmitting network devices. In one embodiment, the timing recovery block 206 may also address any timing errors based on the phase difference.

When configured for the PLC communication protocol, the timing recovery block 206 may not use the pilot carry technique. Instead, the timing recovery block 206 may estimate the clock frequency of the transmitting network device, and then compare the estimated clock frequency with the clock frequency of the receiving network device to determine the phase difference.

The equalization block 208 equalizes data for one or more carriers. The network device transmits and receives signals using each of the communication protocols via a plurality of carriers. Each carrier has a portion (referred to herein as the "carrier frequency") of a frequency bandwidth allocated for each of the communication protocols. The network device transmits and receives communication using the PLC communication protocol over a predefined bandwidth (referred to herein as the "PLC bandwidth"). The PLC communication protocol may divide the PLC bandwidth into thousands of carriers, where each carrier has a certain bandwidth. For example, the PLC bandwidth may be divided into 3,500 carriers, each carrier with a bandwidth of 25 kHz. The equalization block 208 may equalize each of these carriers independently of other carriers.

For many communication protocols, the equalization block 208 may equalize the channel by measuring channel metrics (such as amplitude and phase) on each carrier frequency. Each packet may include data for one or more carriers. The equalization block 208 may apply equalization separately on each carrier frequency. The equalization block 208 may operate similarly when processing packets of the PLC communication protocol and when processing packets of the Wi-Fi communication protocol.

For example, when configured for the PLC communication protocol, the equalization block 208 may equalize the channel separately for each of the 3500 PLC carrier frequencies. When configured for the Wi-Fi communication network, the equalization block 208 may equalize the channel on ~100 different carrier frequencies. In one embodiment, regardless of the communication protocol being used, the block configurator 222 configures the equalization block 208 by setting parameters, and using the same component of the equalization block 208. The block configurator 222 may parameterize the equalization block 208 by providing configuration parameters that indicate the number and/or frequencies of carriers for the packet of the communication protocol.

The MIMO SVD block 210 processes packets using one of polarization techniques. The polarization techniques include Polarization Diversity (PD), Space Diversity (SD), or Space-Polarization Diversity (SPD). In one embodiment, the MIMO SVD block 210 may perform channel inversion and/or beamforming processing on each of the carriers. The MIMO SVD block 210 may perform the channel inversion using matrix decomposition based on one of the polarization techniques. The MIMO SVD block 210 may operate in similar fashion when processing packets of different communication protocols.

The block configurator 222 may configure the MIMO SVD block 210 differently for each of the communication protocols. The block configurator 222 may configure the MIMO SVD block 210 to perform the channel inversion using a different matrix size for each of the communication protocols. For example, the block configurator 222 may use a 2×2 matrix size for the PLC communication protocol, or a 3×3 matrix size for the Wi-Fi communication protocol. In addition, the block configurator 222 may configure the MIMO SVD block 210 to perform the channel inversion for a different number of carriers, depending on the communication protocol.

Thus, the block configurator 222 may parameterize the MIMO SVD block 210 with configuration parameters indicating a polarization technique to be used, which carriers are to be processed, a size of the matrix to be used, etc. In one embodiment, the block configurator 222 may also configure the MIMO SVD block 210 by using block component selecting. In this embodiment, the block configurator 222 may enable a component of the MIMO SVD block 210 that includes functionality associated with the communication protocol of the packet and disable another component of the MIMO SVD block 210 that does not include the functionality associated with the communication protocol of the packet.

The decoder block 212 performs error correction decoding on the packet. The error correction decoding may depend on the type of the communication protocol. For example, the block configurator 222 may configure the decoder block 212 to use turbo codes when processing packets of the PLC communication protocol. The block configurator 222 may configure the decoder block 212 to use low-density parity-check (LDPC) code or convolution when processing packets of the Wi-Fi communication protocol. Thus, the block configurator 222 may use a different error correction encoding for each of the communication protocols.

The block configurator 222 may parameterize the decoder block 212 with configuration parameters indicating which error correction decoding to be used. In one embodiment, the block configurator 222 may also configure the decoder block 212 by using block component selecting. In this embodiment, the block configurator 222 may enable components of the decoder block 212 that includes functionality associated with the communication protocol of the packet and disable components of the decoder block 212 that does not include the functionality associated with the communication protocol of the packet.

The windowing block 218 performs a windowing function on the analog signal received by the network device. The windowing block 218 may taper off a beginning and an end of data included by the packet. A packet may include a plurality of data units, also referred to as samples. A packet may include 100 samples for a packet of a PLC signal, or 1,000 samples for a packet of a Wi-Fi signal. In one example, the windowing block 218 may taper off the first ten samples, and also taper down the last 10 samples. In another example, the data of the packet may include 1,000 samples. In this case, the windowing block 218 may taper off the first fifty samples, and also taper down the last 50 samples. The windowing block 218 may multiply the data by a multiplier to scale the data.

The block configurator 222 may configure the windowing block 218 by parameterizing the windowing block 218 using configuration parameters that indicate a scaling coefficient and/or tapering coefficients. The configuration parameters may also indicate the number of samples that are to be processed at the beginning and at the end of the packet.

An SNR estimation block 214 estimates a noise in the analog signal received by the network device. In any system that uses QAM, the SNR estimation block 214 may estimate the noise, for example, by comparing a received constellation point (i.e., as received in the data of the packet) with an expected constellation point.

The block configurator 222 may configure the SNR estimation block 214 for processing packets of each of the communication protocols by parameterizing the SNR estimation block 214. The block configurator 222 may parameterize the SNR estimation block 214 by configuration parameters indicating a type of QAM, a type of SNR estimation, and/or expected constellation point(s). The block configurator 222 may also parameterize the SNR estimation block 214 by parameters indicating which carriers are to be processed.

The jammer mitigation block 216 identifies a location and/or frequency of an interfere signal in the analog signal received by the network device. The jammer mitigation block 216 may be used in conjunction with operation of the windowing block 218. The block configurator 222 may configure the jammer mitigation block 216 by disabling some, or all, of the functionality of the jammer mitigation block 216 when processing packets of some communication protocols.

The block configurator 222 may configure the jammer mitigation block 216 for each of the communication protocols by using block component selecting. In this embodiment, the block configurator 222 may enable and/or disable different components of the jammer mitigation block 216. For example, if configured for the Wi-Fi communication protocol, the jammer mitigation block 216 may process data that was received on a Wi-Fi signal with high amplitude and noise localized to certain frequencies.

The block configurator 222 may disable most, or all, of the functionality of jammer mitigation block 216 for the PLC communication network. Thus, the block configurator 222 may disable the jammer mitigation block 216 functionality to let a packet pass through the jammer mitigation block 216 to a next DSP block in the receive path.

The time-tracking block 220 synchronizes the network device with a data unit. The time-tracking block 220 determines the location of a data unit in the packet. The time-tracking block 220 may determine the location of data units of the packets using one of various techniques. The time-tracking block 220 may estimate a location of each data unit by locating a pre-amble in each packet. The pre-amble may be a repeating pattern of OFDM symbols.

The block configurator 222 may configure the time-tracking block 220 for operation in each of the communication protocols by parameterizing the time-tracking block 220 block using configuration parameters. The configuration parameters may indicate one or more symbols that indicate a preamble of a data unit in the packet. In the Wi-Fi and in PLC communication protocols, the preamble may consist of repeated OFDM symbols.

Figure 3:
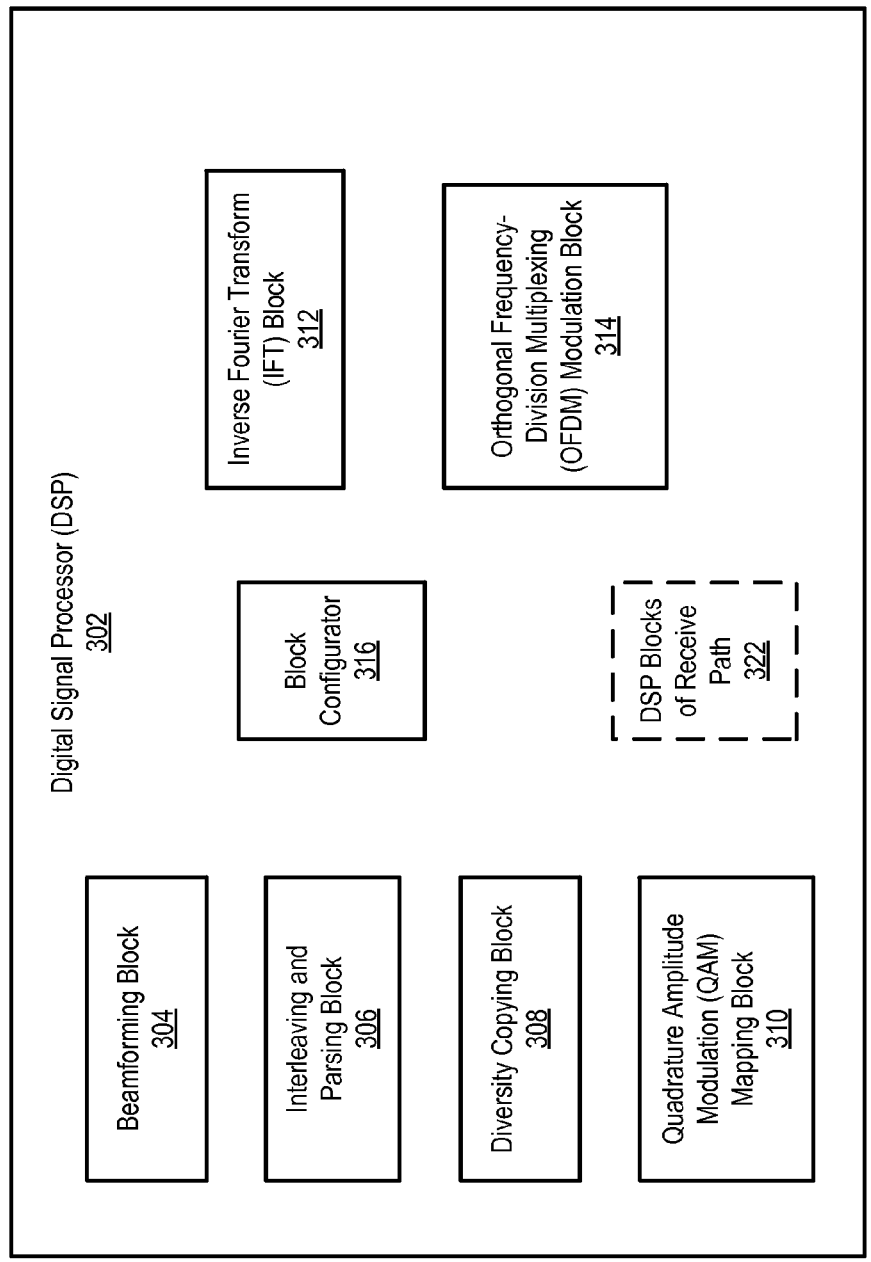
FIG. 3 is a diagram showing example components of a digital signal processor used for processing packets for transmission.

FIG. 3 is a diagram showing components of a digital signal processor used for processing packets for transmission. The DSP 302 may include a beamforming block 304, an interleaving and parsing block 306, a diversity copying block 308, a QAM mapping block 310, an IFT block 312, and an OFDM modulation block 314. The DSP 302 also includes a block configurator 316 that configures the DSP blocks 304-314 for processing packets to be transmitted by a CCI, such as CCI 110. The DSP 302 may receive the packets from a MAC (not shown in FIG. 3). The DSP 302 may also include DSP blocks of the receive path 322, as described with reference to FIG. 2. In one embodiment, the DSP 202 of FIG. 2 and the DSP 302 of FIG. 3 may be implemented using the same DSP. In another embodiments, the DSP 202 of FIG. 2 and the DSP 302 of FIG. 3 are implemented using two separate DSPs. In one embodiment, the block configurator 222 of FIG. 2 and the block configurator 316 of FIG. 3 may be implemented using the same DSP block. In another embodiments, the block configurator 222 of FIG. 2 and the block configurator 316 of FIG. 3 are implemented using two separate DSP blocks.

The beamforming block 304 is for shaping data of an analog or digital signal for transmission. The beamforming block 304 may apply pre-coding coefficients based on the estimated channel (on each carrier) to the data. In one embodiment, the block configurator 316 may configure the beamforming block 304 similarly between the multiple communication protocols (e.g., between the PLC and the Wi-Fi communication protocols).

The beamforming block 304 may perform its precoding operation using a different matrix size for each of the communication protocols. For example, for communication received using the PLC communication protocol, the beamforming block 304 may use a 2×2 pre-coding matrix. For communication using the Wi-Fi communication protocol, the beamforming block 304 may use a 2×2 matrix, a 3×3 matrix, or a larger matrix. The beamforming block 304 may operate on a different number of carriers, as specified by the communication protocol being used.

The block configurator 316 may configure the beamforming block 304 using parameterization. In this embodiment, the configuration parameters may indicate a polarization technique to be used, which carriers are to be processed, a size of the matrix to be used, etc. In one embodiment, the block configurator 316 may configure the beamforming block 304 by using block component selecting. In this embodiment, the block configurator 222 may enable components of the beamforming block 304 that includes this functionality. The block configurator 316 also disable components of the beamforming block 304 that do not include the functionality corresponding to the determined communication protocol.

The interleaving and parsing block 306 indicates which bits of data (of the packet) are to be transmitted using different carriers. The interleaving and parsing block 306 can, for example, select first two bits of a data to correspond to a first carrier and select second two bits of the data to correspond to a second carrier. The block configurator 316 may parameterize the interleaving and parsing block 306 by providing configuration parameters that indicate which bits of the data correspond to certain carriers.

The diversity copying block 308 increases the redundancy of data of each packet for transmission. The redundancy is increased such that a receiving network device may recover data using fewer than all of the modulated carriers and/or fewer than all of the modulated symbols. The block configurator 316 may parameterize the diversity copying block 308 by providing configuration parameters that indicate the amount and/or type of redundancy of each carrier.

The QAM mapping block 310 is for mapping data values onto waveforms for the carriers. The QAM mapping block 310 may process data of each packet using groups of data bits depending on a constellation used for a current symbol (e.g., a Binary Phase Shift Keying (BPSK), Quadrature Phase Shift Keying (QPSK), 8-QAM, 16-QAM constellation). The QAM mapping block 310 maps data values represented by those bits onto in-phase (I) and quadrature-phase (Q) components of a waveform for the carrier for the current symbol.

The block configurator 316 may parameterize the QAM mapping block 310 by providing configuration parameters that indicate the constellation used for the symbols, and/or the number and type of the frequencies for the carrier used by the communication protocol. In one embodiment, the block configurator 316 may configure the QAM mapping block 310 by using block component selecting. In this embodiment, the block configurator 316 may enable components of the QAM mapping block 310 that includes this functionality. The block configurator 316 may disable components of the QAM mapping block 310 that do not include the functionality corresponding to the selected communication protocol. For example, the block configurator 316 may enable components of the QAM mapping block 310 associated with a 16-QAM constellation, but disable components of the QAM mapping block 310 associated with the BPSK and/or QPSK constellation.

The IFT block 312 performs an inverse discrete Fourier transform of a waveform for the carrier to be transmitted. The IFT block 312 may be performed using one or more IFT techniques. The IFT block 312 can be implemented using Inverse Fast Fourier Transform (IFFT) algorithm. The block configurator 316 may parameterize the IFT block 312 by providing configuration parameters that characterize the IFT operation.

The OFDM modulation block 314 modulates the waveform (i.e., as received from the IFT block 312) onto N carrier waveforms. The block configurator 316 may parameterize the OFDM modulation block 314 by providing configuration parameters that indicate the number and frequency of the N carrier waveforms.

Figure 4:
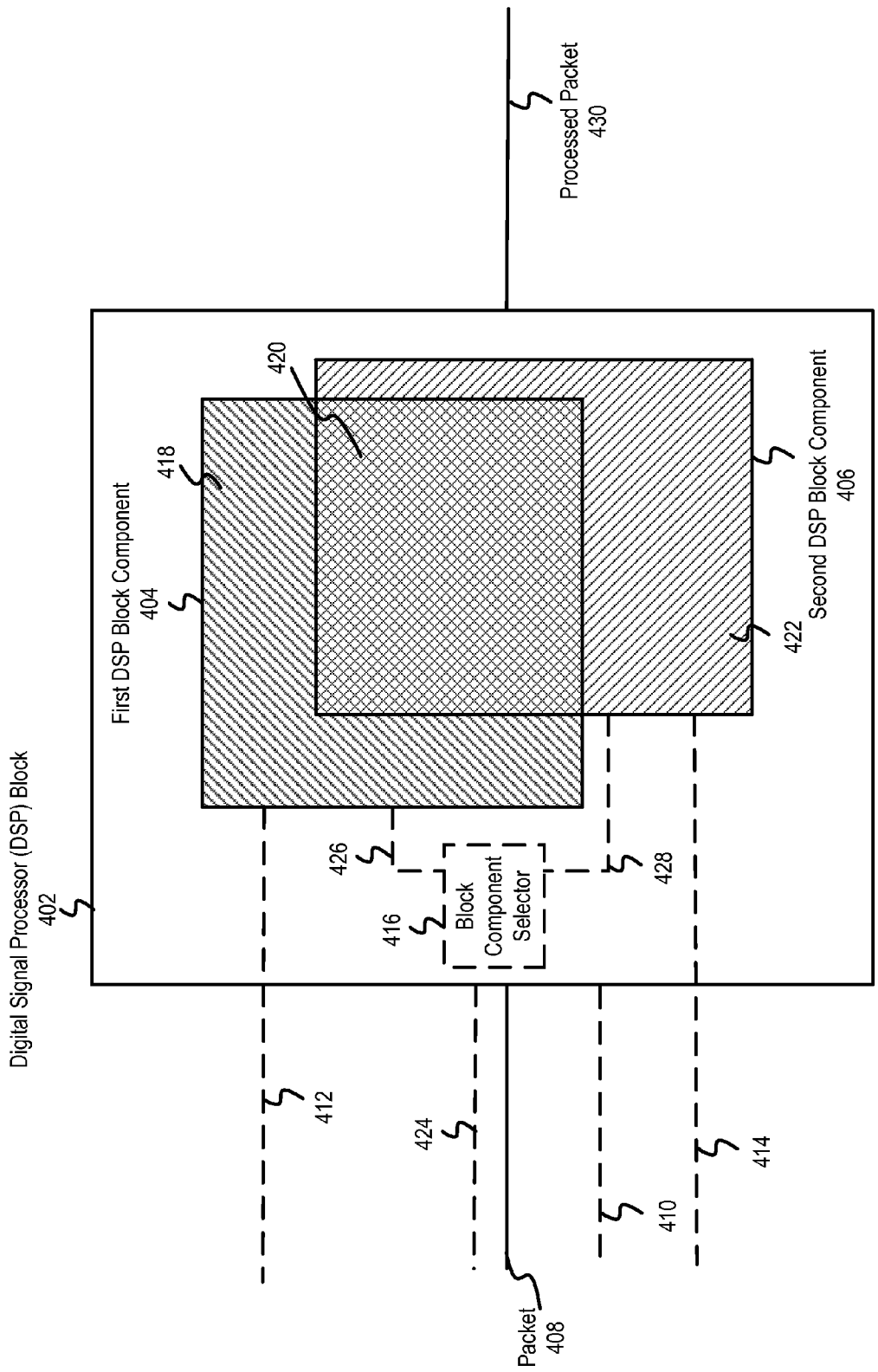
FIG. 4 is a diagram showing configuration of an example digital signal processor block.

FIG. 4 is a diagram showing configuration of an example digital signal processor block. The DSP block 402 may be any one of the DSP blocks described above with reference to FIGS. 2 and 3 (e.g., AGC block 204, beamforming block 304, etc.). The DSP block may include a first DSP block component 404 and a second DSP block component 406. The DSP block 402 receives and processes a packet 408. For configuration with parameterization, the DSP block 402 may also receive one or more configuration parameters 410. For configuration with block component selecting, the DSP block 402 may also receive, from a block configurator (e.g., block configurator 222, 316), instructions 412 and 414 that enable or disable components of the DSP block 402. In one embodiment, the DSP block 402 may also include a block component selector 416. After the DSP block 402 is configured, the DSP block 402 processes the packet 408. The DSP block 402 then propagates the processed packet 430 down the receive path or transmit path.

As shown by FIG. 4, the first DSP block component 404 includes a first sub-component 418 and a second sub-component 420. The second DSP block component 406 includes the second sub-component 420 and a third sub-component 422. Thus, the second sub-component 420 is shared between the first DSP block component 404 and the second DSP block component 406. The instructions 412 may enable the first DSP block component 404, whereas the instructions 414 may disable the second DSP block component 406. In this case, the first and the second sub-components 418 and 420 are enabled, while the third sub-component 422 is disabled. In another example, the instructions 412 may disable the first DSP block component 404, whereas the instructions 414 may enable the second DSP block component 406. In this case, the first sub-component 418 is disabled, while the second and third sub-components 420 and 422 are enabled.

In another embodiment, instead of receiving instructions 412 and 414 that enable and disable DSP block components, the DSP block 402 receives an indication 424 from the block configurator (e.g., the block configurator 222 or the block configurator 316). The indication 424 may indicate the appropriate functionality of the DSP blocks, a determined communication protocol, and/or other information specific to the DSP block 402. Upon receiving the indication 424, the block component selector 416 may generate first instructions 426 and second instructions 428. The first instructions 426 may be similar to instructions 412. The second instructions 428 may be similar to instructions 414.

In some embodiments, the DSP block 402 is configured by enabling physical hardware corresponding to the respective sub-components 418, 420, and/or 422. The physical hardware may correspond to multipliers, adders, AND gates, OR gates, and/or other logical gates and/or modules. The first DSP block component 404 may be associated with the Wi-Fi communication protocol, and the second DSP block component 406 may be associated with the PLC communication protocol. An implementation of the DSP block 402 in the PLC communication protocol may use two multipliers and one adder. An implementation of the DSP block 402 in the Wi-Fi communication protocol may use one multipliers and two adders. In one implementation, the first sub-component 418 includes a single multiplier, the second sub-component 420 includes a single multiplier and a single adder, and the third sub-component 422 includes a single adder.

Figure 5:
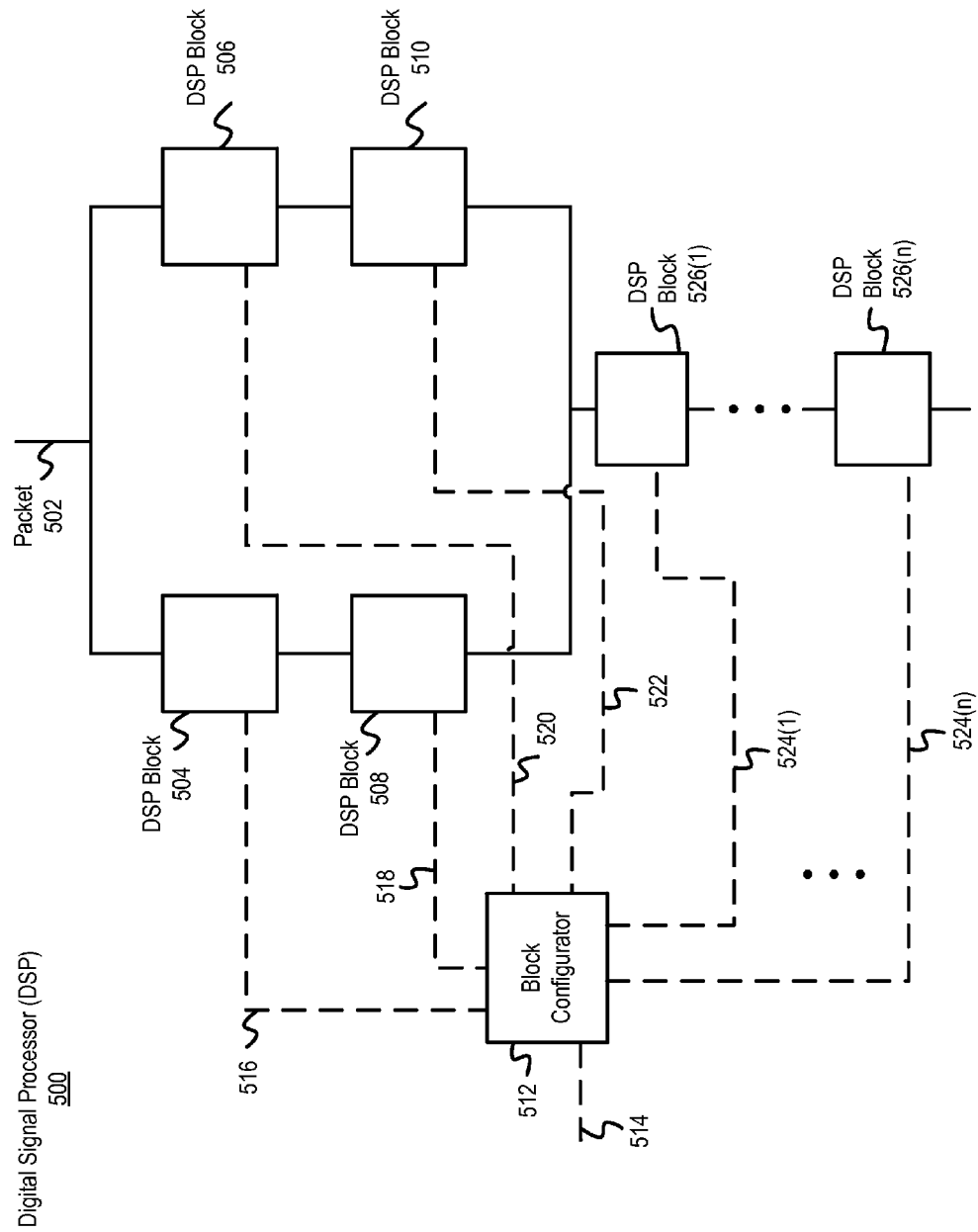
FIG. 5 is a diagram showing example paths that use digital signal processor blocks.

FIG. 5 is a diagram showing example paths that use digital signal processor blocks. The DSP 500 includes DSP blocks 504, 506, 508, 510, and 526(1)-526(n). A first receive path through the DSP 500 may include the DSP blocks 504, 508, and 526. A second receive path through the DSP 500 may include the DSP blocks 506, 510, and 526. The DSP 500 also includes a block configurator 512. The block configurator 512 may be an implementation of the block configurator 222 and 316 of FIGS. 2 and 3, respectively. The block configurator 512 may receive instructions 514 from a DSP block selector, such as the DSP block selector 118. The block configurator 512 may transmit instructions 516, 518, 520, 522, and/or 524(1)-524(n) to the DSP blocks 504, 506, 508, 510, and/or 526 in the manner described below.

The DSP 500 may be used for dynamic scheduling and/or for static scheduling in the receive path. In dynamic scheduling, the communication protocol of the packet 502 is unknown to the block configurator 512 at the time the packet 502 is received by the DSP 500. In dynamic scheduling, the DSP blocks 504-510 are used separately for components associated with each of the two communication protocols. The DSP blocks 526 are shared between the two communication protocols.

In static scheduling, the communication protocol of the packet 502 is known to the block configurator 512 at the time the packet 502 is received by the DSP 500. Thus, in static scheduling, the block configurator 512 may select the DSP blocks 504 and 508 or the DSP blocks 506 and 510 corresponding to the known communication protocol. The communication protocol of the packet 502 may be known, for example, based on a schedule.

The following discussion of FIG. 5 is directed to the dynamic scheduling. At the time that the DSP blocks 504 and 506 receive the packet 502, the communication protocol of the packet 502 is not yet determined by the block configurator 512. With reference to FIG. 2, the DSP blocks 504 and 506 may each implement AGC block 204. Each DSP block 504 and 506 is configured for a different communication protocol. The DSP block 504 may implement the AGC block 204 configured for the PLC communication protocol. The DSP block 506 may implement the AGC block 204 configured for the Wi-Fi protocol. In one embodiment, the DSP blocks 504, 506, 508, and 510 are not reconfigurable, whereas the DSP blocks 526 are reconfigurable.

As FIG. 5 illustrates, the block configurator 512 may instruct the DSP blocks 504-510 to propagate and process the packet 502 through both of the receive paths. Thus, the block configurator 512 may instruct the DSP blocks 504-510 to propagate the packet 502 through the DSP blocks 504 and 508 of the first receive path, and also to propagate the packet 502 through the DSP blocks 506 and 510 of the second receive path. The packet 502 may be processed by the DSP block 504 and by the DSP block 506 in parallel. Once the block configurator 512 determines the communication network, the block configurator 512 then configures the DSP blocks 526(1)-526(n) for the determined communication protocol of the packet 502. The block configurator 512 may configure the DSP blocks 526(1)-526(n) by sending instructions 524(1)-524(n).

After the DSP blocks 504 and 506 process the packet 502, the DSP blocks 504 and 506 may communicate with the block configurator 512. The block configurator 512 may attempt to determine the communication protocol of the packet 502 prior to propagating the packet 502 through the DSP blocks 508 and 510. If the communication protocol of the packet 502 cannot be determined, the block configurator 512 may transmit, to the DSP blocks 508 and 510, instructions 518 and 520 for processing the packet through both of the DSP blocks 508 and 510.

If the block configurator 512 determines the communication protocol of the packet 502, the block configurator 512 may transmit, to the DSP blocks 508 and 510, instructions 518 and 520 for processing the packet through one of the DSP blocks 508 or 510. The block configurator 512 may determine that the single DSP block 508 or the single DSP block 510 is associated with the receive path for the determined communication protocol. In other words, although the DSP 500 may include redundant hardware for propagating the packet 502 through both receive paths, the block configurator 512 may determine to use one of the DSP blocks for one of the receive paths and not the other. The block configurator 512 may also transmit the instructions 524 to configure the DSP blocks 526 based on the determined communication protocol of the packet 502.

Figure 6:
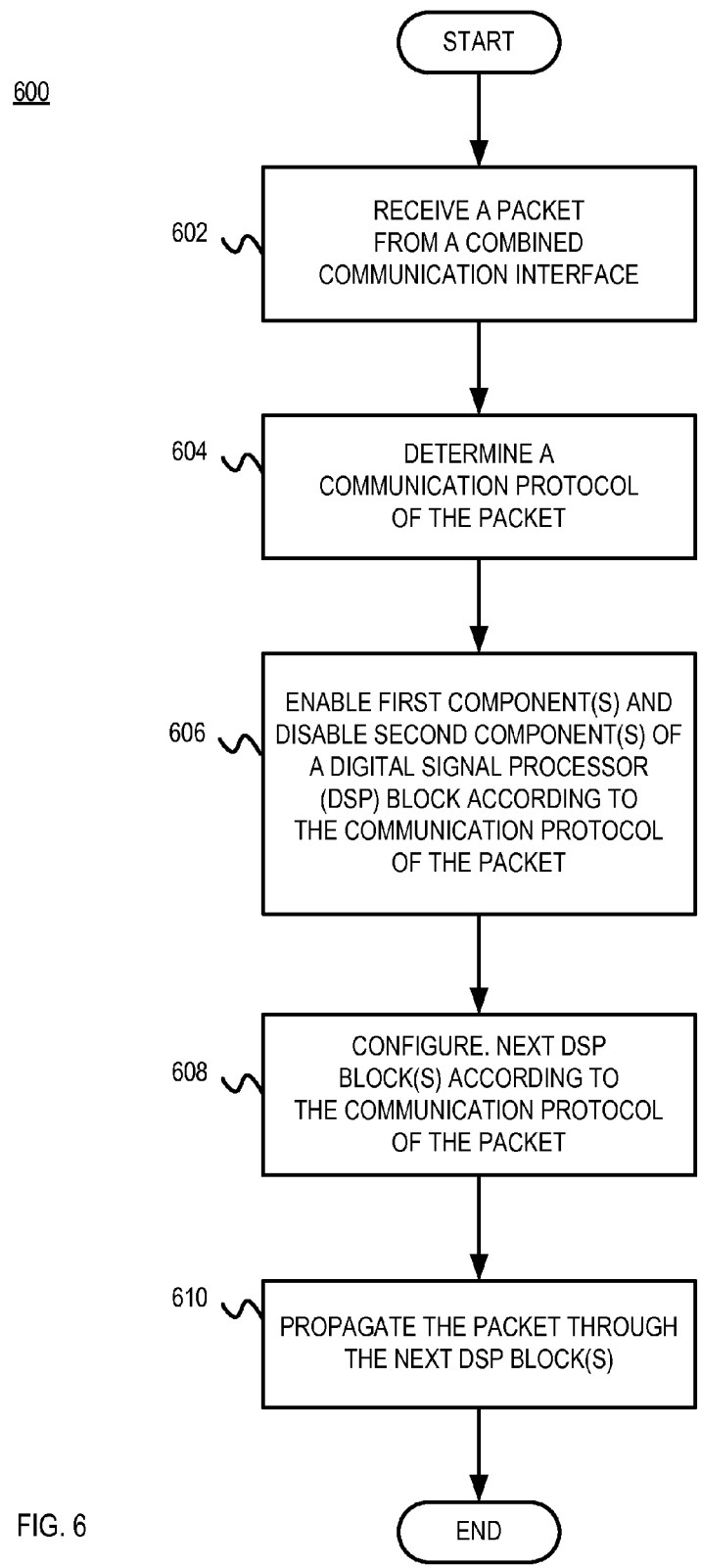
FIG. 6 is a flow diagram illustrating example operations of the network device in multiple networks.

FIG. 6 is a flow diagram illustrating example operations of the network device in multiple networks. The flow diagram 600 is described with reference to the systems and components described in FIG. 1 (for illustration purposes and not as a limitation). The example operations may be carried out by one or more components in the network device 102, such as the DSP block selector 118 of the network device 102.

Beginning with operation 602, the DSP receives a packet from the CCI 110. As described above with reference to FIG. 1, the CCI 110 of the network device receives an analog signal over one of the links 108. The CCI 110 then digitizes the analog signal and propagates packets of the analog signal to a DSP, such as the DSP 112.

Proceeding to operation 604, the DSP block selector determines a communication protocol of the packet. The DSP block selector may determine the communication protocol of the packet based on a known schedule, by propagating the packet in parallel through DSP blocks for multiple communication protocols, or by delaying the processing of the packet to determine the communication protocol. One embodiment of this operation is further described below with reference to FIG. 7.

Proceeding to operation 606, the DSP block selector configures a DSP block using block component selecting. The DSP block selector enables one or more first components of a DSP block and disables one or more second components of the DSP block, according to the communication protocol of the packet. One embodiment of this operation is described below, with reference to FIG. 8.

Proceeding to operation 608, the DSP block selector configures a next DSP block according to the communication protocol of the packet.

Proceeding to operation 610, the DSP block selector propagates the packet through the next DSP block. After block 610, the operations end.

Figure 7:
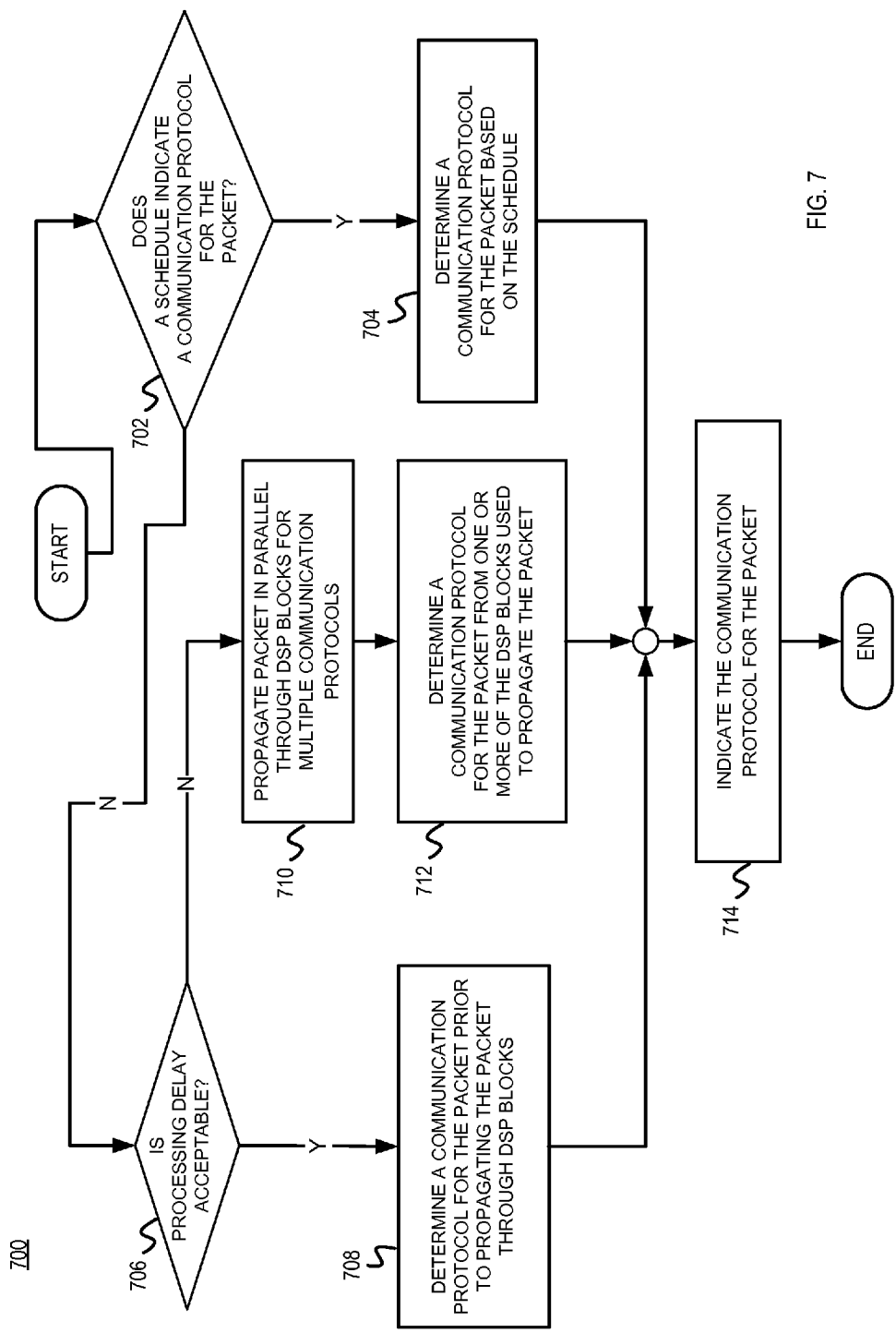
FIG. 7 is a flow diagram illustrating an example determination of a communication protocol for a network device operating in multiple networks.

FIG. 7 is a flow diagram illustrating an example determination of a communication protocol for a network device operating in multiple networks. The flow diagram 700 is described with reference to FIG. 1 (for illustration purposes and not as a limitation). The example operations may be carried out by one or more components in the network device 102, such as the DSP block selector 118 of the network device 102. The flow diagram 700 may be an implementation of the operation 604 of the flow diagram 600 of FIG. 6.

Beginning with operation 702, the DSP block selector 118 determines whether a schedule indicates a communication protocol for the packet. If the DSP block selector 118 determines that the schedule indicates a communication protocol for the packet, the flow continues to operation 704. If the DSP block selector 118 determines that the schedule does not indicate a communication protocol for the packet, or if no such schedule exists, the flow continues to operation 706.

At operation 704, the DSP block selector 118 determines a communication protocol for the packet based on the schedule. The schedule may indicate time intervals in which the network device is available for communication using each of the communication protocols. The network device may be able to communicate using one of the communication protocols at a time. Thus, the DSP block selector 118 matches the communication protocol of the packet to the communication protocol indicated by the schedule. The generation and use of the schedule is described in more detail below with reference to FIGS. 9 and 10. The flow continues at operation 714.

At operation 706, the DSP block selector 118 determines whether a processing delay is acceptable. The processing delay is a length of time it would take to determine the communication protocol without propagating the packet through the DSP blocks. In one embodiment, the DSP block selector 118 may estimate the processing delay. The DSP block selector 118 may then compare the processing delay to a delay threshold. If the processing delay is acceptable (e.g., below the threshold), the flow continues at operation 708. If the processing delay is not acceptable (e.g., at or above the threshold), the flow continues at operation 710.

At operation 708, the DSP block selector 118 determines a communication protocol for the packet prior to propagating the packet through the DSP blocks. The flow continues at operation 714.

At operation 710, the DSP block selector 118 propagates the packet in parallel through the DSP blocks for multiple communication protocols. With reference to FIG. 5, a DSP block selector (for example, DSP block selector 118) may instruct the block configurator 512 to propagate the packet 502 in parallel through both the DSP block 504 and through the DSP block 506. The term "parallel" means that the packet is propagated to the DSP blocks 504 and 506 at substantially the same time. However, the packet 502 may be processed by each of the DSP blocks 504 and 506 for a different amount of time. The flow continues at operation 712.

At operation 712, the DSP block selector 118 determines a communication protocol for the packet from one or more of the DSP blocks used to propagate the packet. With reference to FIG. 5, a DSP block selector (for example, DSP block selector 118) may determine the communication protocol based on information from the block configurator 512. The block configurator 512 may obtain information from the DSP blocks 504, 506, 508, and/or 510, and generate information for a DSP block selector (for example, DSP block selector 118). The flow continues at operation 714.

At operation 714, the DSP block selector 118 indicates the communication protocol for the packet. The indicated communication protocol may be used by the DSP block selector 118 in operation 608. After operation 714, the operations end.

Figure 8:
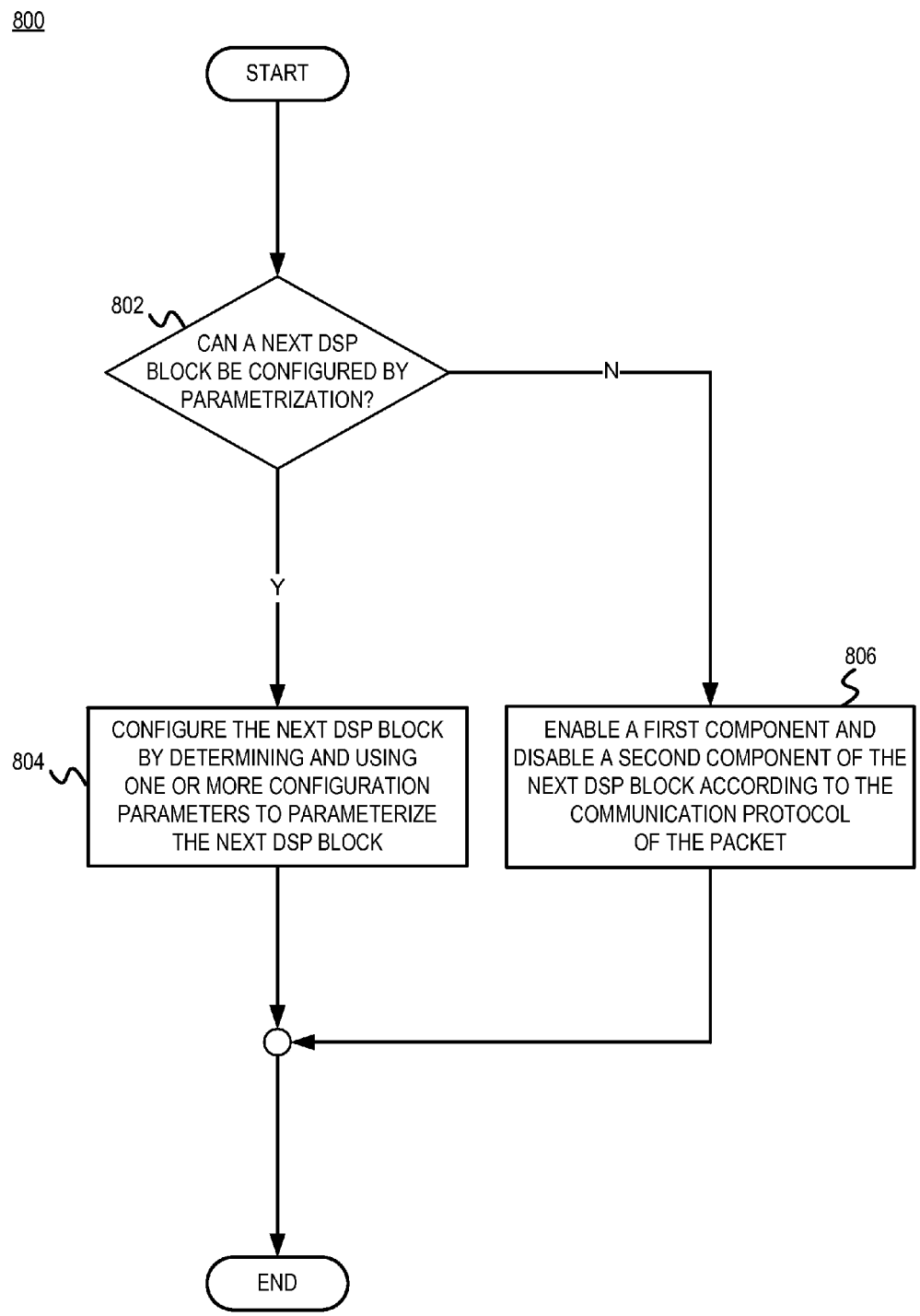
FIG. 8 is a flow diagram illustrating an example configuration of a digital signal processor block when propagating a packet.

FIG. 8 is a flow diagram illustrating an example configuration of a digital signal processor block when propagating a packet. The flow diagram 800 is described with reference to in FIG. 1 (for illustration purposes and not as a limitation). The example operations may be carried out by the DSP block selector 118 of the network device 102. The flow diagram 800 may be an implementation of the operation 608 of the flow diagram 600 of FIG. 6.

Beginning with operation 802, the DSP block selector 118 determines whether a next DSP block may be configured by parameterization. The DSP block selector 118 may make this determination based on the type of the DSP block and on the type of the communication protocol. Examples of DSP blocks are described above with reference to FIGS. 2 and 3. It is noted that a DSP block may be preconfigured based on processing of a previous packet. The DSP block may have a similar configuration for different protocols, e.g., the Multimedia over Coax Alliance (MoCa) communication protocol and for the Wi-Fi communication protocol. For example, a DSP block may be configured for the MoCa communication protocol by using block component selecting to enable a first component of the DSP block and disable a second component of the DSP block. This DSP block may then be configured for operation in the Wi-Fi protocol simply by parameterizing the DSP block. If the next DSP block is able to be configured by parameterization, the flow continues at operation 804. If the next DSP block cannot be configured by parameterization, the flow continues at operation 806.

At operation 804, the DSP block selector 118 configures the next DSP block by determining and using one or more configuration parameters to parameterize the next DSP block. The flow continues at operation 808.

At operation 806, the DSP block selector 118 configures the next DSP block by using block component selecting to enable a first component of the DSP block and disable a second component of the DSP block. Examples of enabling and disabling components of DSP blocks are described above with reference to FIG. 4. The flow ends.

Figure 9:
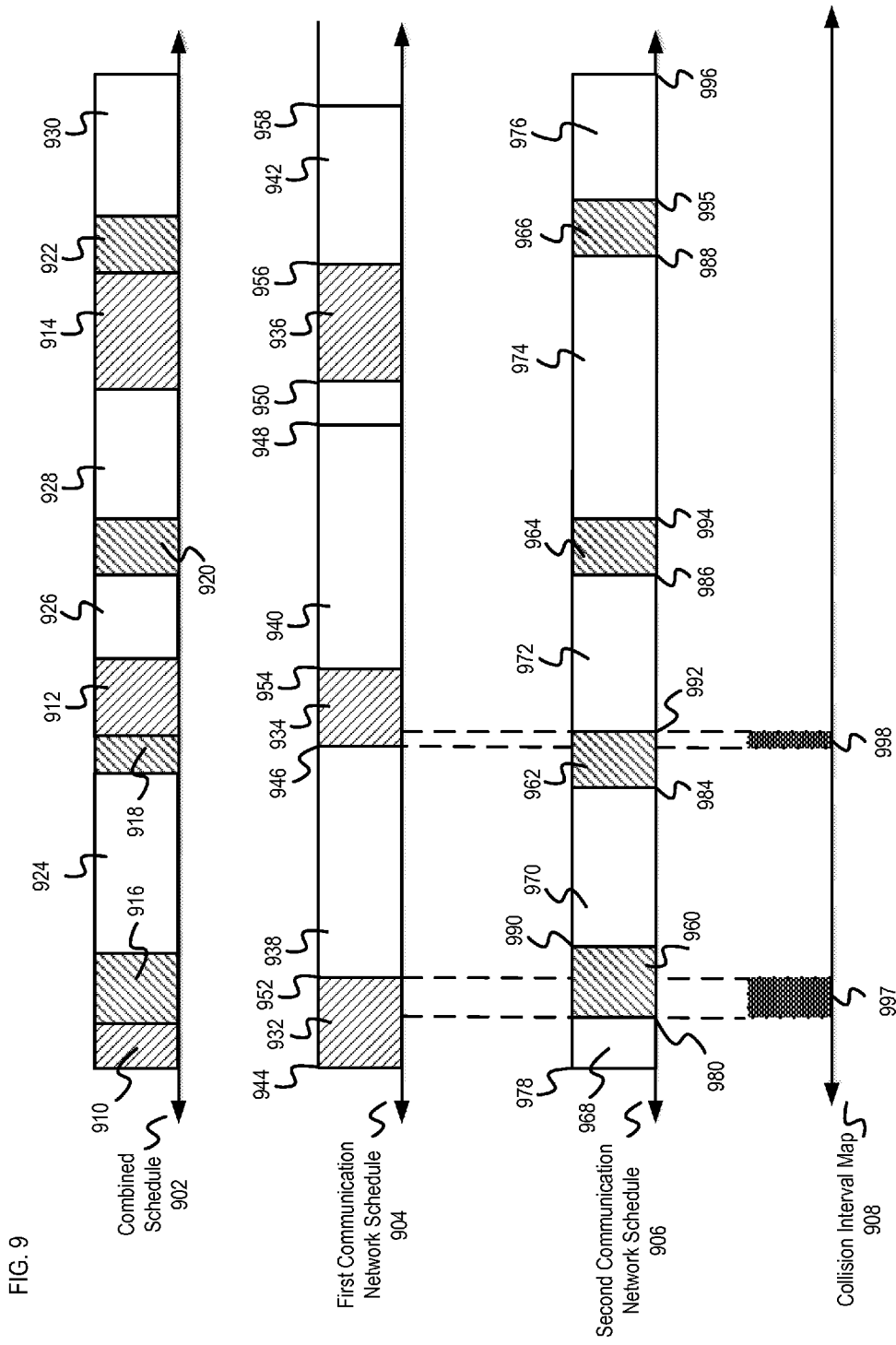
FIG. 9 is a diagram illustrating various schedules of a network device operating in multiple communication networks.

FIG. 9 is a diagram illustrating various schedules of a network device operating in multiple communication networks. FIG. 9 illustrates a combined schedule 902, a first communication network (FCN) schedule 904, and a second communication network (SCN) schedule 906 (referred to as collectively as schedules 902-906). FIG. 9 also illustrates a collision interval map 908. Each of the schedules 902-906 and the collision interval map 908 may be stored by memory, such as memory 116.

In one embodiment, the schedules 902-906 may be generated by a scheduler (e.g., the scheduler 126) of the network device. In another embodiment, the schedules 902-906 may be generated by the processor 114. In yet another embodiment, the schedules 902-906 may be received by the network device 102 via another network device.

The network device may be configured to be available to communicate over one communication network at a time. The schedules 902-906 indicate when the network device is available to communicate over each of the communication networks. Because there can be multiple schedules (e.g., a different schedule for each different communication network), the network device may be scheduled to be available for communication over two (or more) communication networks contemporaneously, i.e., at the same time. As the network device can only communicate over one communication network at a time, this is a scheduling conflict, and is referred to as a collision interval. The description below describes how the schedules 902-906 are determined, as well as a communication behavior of the network device during collision intervals 997 and 998.

The combined schedule 902 indicates active time periods during which the network device is available for communication over each of the communication networks using the respective communication protocols. The combined schedule 902 also indicates inactive time periods during which the network device is unavailable for communication using each of the communication protocols.

The combined schedule 902 indicates first-communication-network-available (FCNA) time periods 910, 912, and 914 during which the network device is available for communication over the first communication network (i.e., the PLC communication network). The FCNA time periods 910, 912, and 914 are referred to as active time periods for the first communication network. The combined schedule 902 indicates second-communication-network-available (SCNA) time periods 916, 918, 920, and 922 during which the network device is available for communication over the second communication network (i.e., the Wi-Fi communication network). The combined schedule 902 indicates both-communication-networks-unavailable (BCNU) time periods 924, 926, and 928, and 930 during which the network device is unavailable for communication over both of the communication networks.

The FCN schedule 904 network-device-available (NDA) time periods 932, 934, and 936 during which the network device is available for communication over the first communication network using the first communication protocol. The FCN schedule 904 also indicates network-device-unavailable (NDU) time periods 938, 940, and 942 during which the network device is unavailable for communication over the first communication network.

The FCN schedule 904 indicates that NDA time period 932 starts at a time instance 944 and ends at a time instance 952. The FCN schedule 904 indicates that the NDU time period 938 starts at a time instance 952 and ends at a time instance 946. The FCN schedule 904 indicates that the NDA time period 934 starts at a time instance 946 and ends at a time instance 954. The FCN schedule 904 indicates that the NDU time period 940 starts at a time instance 954 and ends at a time instance 950. The FCN schedule 904 indicates that the NDA time period 936 starts at a time instance 950 and ends at a time instance 956. The FCN schedule 904 indicates that the NDU time period 942 starts at a time instance 956 and ends at a time instance 958.

The FCN schedule 904 may also show periodicity of the first communication protocol. The first communication protocol may require communication to be synchronized with a certain period, such as a period of 33 ms based on a 60 Hz Powerline signal, or a period of 40 ms based on a 50 Hz alternating current (AC) Powerline signal, for the PLC communication network. The FCN schedule 904 shows a first period between the time instance 944 and a time instance 946, a second period between the time instance 946 and a time instance 948, and a third period between the time instance 948 and the time instance 958.

The FCN schedule 904 may also indicate a sleep schedule for the network device in the first communication network. The sleep schedule indicates when the network device is unavailable for communication over the first communication network. The FCN schedule 904 may indicate that the network device will be in a sleep state in the first communication network during the NDU time periods 938, 940, and 942. Depending on the implementation, the FCN schedule 904 may also indicate that the network device transmits an indication of a sleep state on the first communication network at time instances 952, 954, and 956. As illustrated by the combined schedule 902, the network device may be available for communication over the second communication network while the network device is unavailable and thus scheduled to be in the sleep state in the first communication network. The scheduler may communicate the FCN schedule 904 to the other devices on the first communication network.

Similarly, the SCN schedule 906 indicates second-communication-network-available (SCNA) time periods 960, 962, 964, and 966 during which the network device is available for communication over the second communication network using the second communication protocol. The SCNA time periods 960, 962, 964, and 966 are referred to as active time periods for the second communication network. The SCN schedule 906 also indicates second-communication-network-unavailable (SCNU) time periods 968, 970, 972, 974, and 976 during which the network device is unavailable for communication over the second communication network.

The SCN schedule 906 indicates that the SCNU time period 968 starts at a time instance 978 and ends at a time instance 980. The SCN schedule 906 indicates that the SCNA time period 960 starts at a time instance 980 and ends at a time instance 990. The SCN schedule 906 indicates that the time period 970 starts at the time instance 990 and ends at a time instance 984. The SCN schedule 906 indicates that the SCNA time period 962 starts at the time instance 984 and ends at a time instance 992. The SCN schedule 906 indicates that the time period 972 starts at the time instance 992 and ends at a time instance 986. The SCN schedule 906 indicates that the SCNA time period 964 starts at the time instance 986 and ends at a time instance 994. The SCN schedule 906 indicates that the time period 974 starts at the time instance 994 and ends at a time instance 988. The SCN schedule 906 indicates that the SCNA time period 966 starts at the time instance 988 and ends at a time instance 995. The SCN schedule 906 indicates that the SCNU time period 976 starts at the time instance 995 and ends at a time instance 996.

The SCN schedule 906 may also show periodicity of the second communication protocol. The second communication protocol may also require communication to be synchronized with a certain period. In one example, the first communication protocol is a PLC communication protocol and the second communication protocol is not a PLC communication protocol. Thus, the periodicity constraints of the second communication protocol may be more relaxed than the periodicity constraints of the PLC communication protocol.

The SCN schedule 906 shows a first period between the time instance 978 and a time instance 984, a second period between the time instance 984 and a time instance 986, and a third period between the time instance 986 and a time instance 996. It is noted that the third period of the second communication protocol includes two SCNA time periods 964 and 966. The SCN schedule 906 may also indicate a sleep schedule for the network device in the second communication network. The sleep schedule indicates when the network device is unavailable for communication over the second communication network. The SCN schedule 906 may indicate that the network device will be in a sleep state in the second communication network during the SCNU time periods 968, 970, 972, 974, and 976. Depending on the implementation, the SCN schedule 906 may also indicate that the network device transmits an indication of a sleep state at time instances 978, 990, 992, 994, and 995. As illustrated by the combined schedule 902, the network device may be available for communication over the first communication network while the network device is unavailable and thus scheduled to be in the sleep state in the second communication network.

Figure 10:
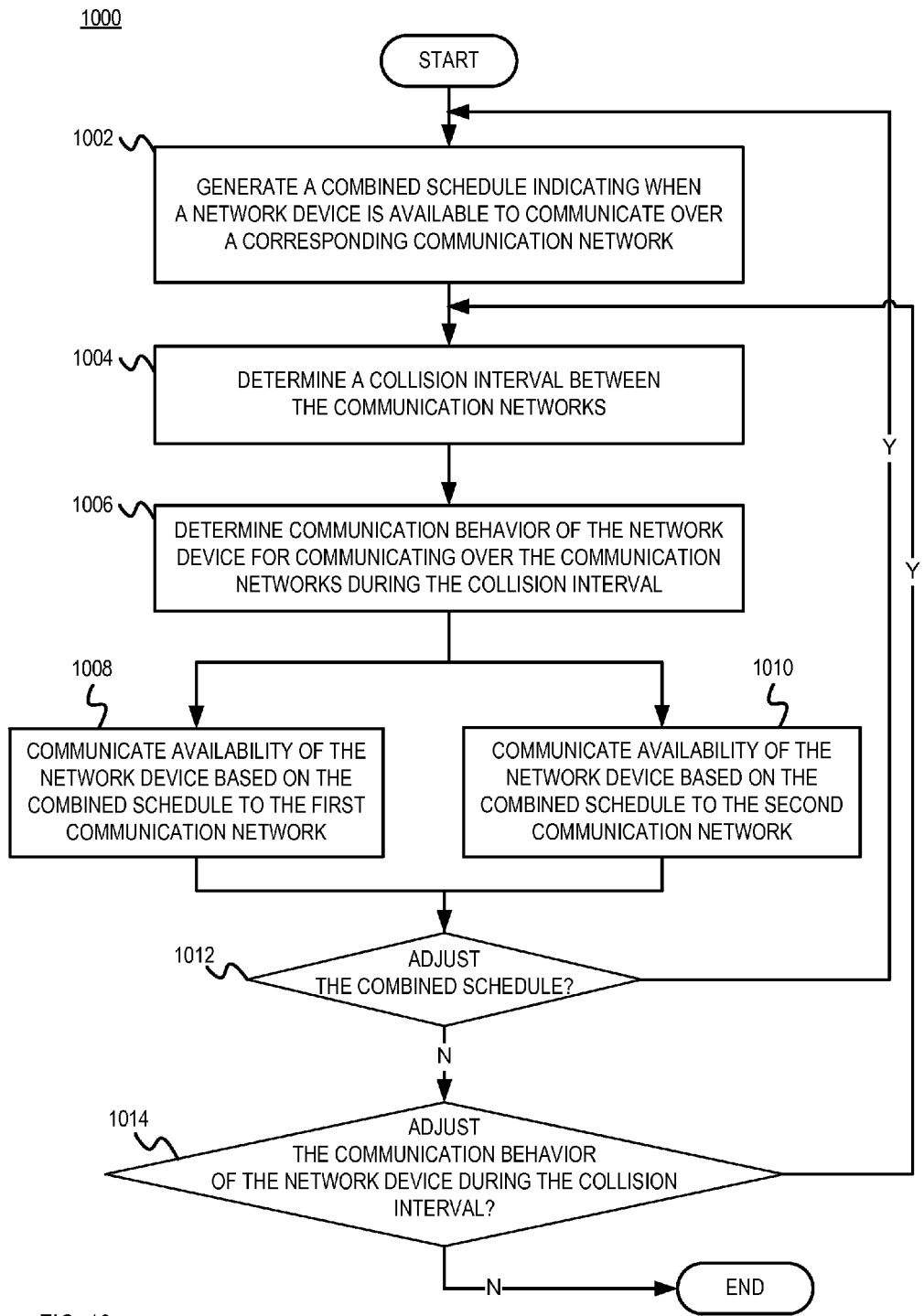
FIG. 10 is a flow diagram illustrating an example generation of a combined schedule for a network device operating in multiple communication networks.

FIG. 9 also illustrates a collision interval map 908 that shows collision intervals 997 and 998. During each of the collision intervals 997 and 998, the network device appears as being available for communication over both the first communication network and the second communication network. FIG. 10 describes how the scheduler determines the communication behavior of the network device during each of the collision intervals 997 and 998. The combined schedule 902 may include a communication behavior that indicates how the network device is to communicate during collision intervals.

FIG. 10 is a flow diagram illustrating an example generation of a combined schedule for a network device operating in multiple communication networks. The flow diagram 1000 is described with reference to FIG. 1 (for illustration purposes and not as a limitation). The example operations may be carried out by one or more components of the network device 102, such as by the scheduler 126 and/or the processor 114. Although the description below refers to the scheduler 126 carrying out the operations of the flow diagram 1000, it is understood that the processor 114 may carry out some or all of these operations. In some embodiments, the operations of the flow diagram 1000 are performed across one or more processors. For example, the processor of the network device may determine the combined schedule.

Beginning with operation 1002, the scheduler generates a combined schedule indicating when the network device is available to communicate over two or more communication networks. For example, the scheduler generates the combined schedule 902 indicating when the network device is available to communicate over the first communication network and over the second communication network. In one embodiment, the network device may communicate over one of the communication networks at a time.

The scheduler may use a periodicity of each of the communication networks when determining the combined schedule. For example, with reference to FIG. 9, the FCN schedule 904 illustrates three periods of the first communication protocol. The periods are as follows, the first period between the time instances 944 and 946, the second period between the time instances 946 and 948, and the third period between the time instances 944 and 958. If the first communication network is a PLC communication network, then each of the periods may correspond to a beacon period, as defined by the PLC communication protocol. For example, the periodicity of the first communication network may require that the network device be awake for 5 ms every 300 ms. Similarly, the periodicity of the Wi-Fi communication network may require that the network device be awake for 2 ms every 50 ms. Thus, the scheduler generates the combined schedule based on the periodicity constraints, as well as other constraints described below.

The scheduler may monitor the traffic on each of the communication networks. Based on the monitored traffic, the scheduler may determine various communication statistics, such as a ratio of network loads communicated over each of the communication networks. For example, the scheduler may determine communication statistics indicating that much of a communication is transmitted via the first communication network. The scheduler may generate the combined schedule based on the monitored traffic of each of the communication networks. For example, the scheduler may determine a combined schedule that indicates the network device to spend 80% of time being available for communication over the first communication network and 20% of time being available for communication over the second communication network. The scheduler may determine the combined schedule based on other constraints, such as a priority of each of the communication networks, reliability of communication over each of the communication networks, among others.

The scheduler may use these and other constraints to generate the combined schedule. However, due to these constraints, some collisions may be inevitable. During the collision interval, the network device is scheduled to be available to simultaneously communicate over multiple communication networks. The scheduler may determine a combined schedule that reduces a number of collision intervals. Furthermore, the scheduler may adjust the combined schedule based on a changing ratio of network loads over each of the communication networks. The scheduler may dynamically adjust the combined schedule if the flow proceeds from operation 1012 to operation 1002. Thus, the scheduler may generate a combined schedule that favors the communication network with the higher traffic and which meets most or all of the constraints.

The scheduler may generate a combined schedule that reduces, or eliminates, collision intervals between the multiple communication networks. A collision may occur during a collision interval if the network device receives communication over two communication networks during the collision interval. A collision may also occur if the network device receives communication, during the collision interval, over a communication network on which the network device is not actually communicating.

With regard to FIG. 9, a collision occurs if the network device receives communication over the first communication network and over the second communication network, during the collision interval 997. However, the collision interval 997 does not imply that a collision has occurred. In other words, the communication may be received, during the collision interval, over the communication network on which the network device is actually communicating. In this case, there is no collision.

The network device may switch between the communication networks according to the combined schedule. For example, as indicated by the combined schedule, the network device may spend a few milliseconds being available for communication over the first communication network, while appearing to be asleep in the second communication network. As indicated by the combined schedule, the network device may then switch to being available over the second communication network while appearing to be asleep in the first communication network. By using the combined schedule and switching between the operational modes, the network device may appear to operate in both of the communication networks simultaneously.

Since each of the multiple communication networks is independent of each other, the network device creates the combined schedule indicating times during which the network device is available to communicate over each of the communication networks. The network device may switch the hardware module(s) (including DSP block(s)) between the communication networks according to the communication network being used. The flow continues at operation 1004.

At operation 1004, the scheduler determines a collision interval between the communication networks. With reference to FIG. 9, the scheduler may determine a time and duration of the collision intervals 997 and 998. The flow continues at operation 1006.

At operation 1006, the scheduler determines the communication behavior of the network device for communicating over the communication networks during the collision interval. The scheduler may optimize the communication behavior of the network device during the collision interval. The optimization may reduce the time during which the network device is not responsive to communication from each of the communication networks in which the network device appears to be active. The communication behavior indicates how the network device is to communicate over each of the communication networks during a collision interval. The scheduler may store the communication behavior as part of the schedule, such as a part of the combined schedule 902. The network device may implement the communication behavior of the network device during each collision interval, e.g., such as by a DSP block selector determining a communication protocol based on the schedule.

The scheduler may determine the communication behavior by determining a ratio of time to be spent in the first collision interval by the network device communicating over the first communication network and over the second communication network. The scheduler may determine the ratio such that the time communicating over the first communication network is similar, or the same, as the time communicating over the second communication network. With regard to FIG. 9, the scheduler may determine the ratio to evenly split an overall time spent by the network device in each of the communication networks in the collision interval. The scheduler may schedule the network device to be available over the first communication network in the first half of the collision interval 997, and schedule the network device to be available over the second communication network in the second half of the collision interval 997. It is noted that the schedules 904 and 906 may not change for the SCNA time periods 932 and 960, respectively.

The scheduler may determine the communication behavior by scheduling the network device to be available to communicate over the first communication network during a first collision interval (e.g., the collision interval 997). The scheduler may then schedule the network device to be available to communicate over the second communication network during a second collision interval (e.g., the collision interval 998). Thus, the scheduler may schedule the actual availability of the network device by alternating between communication networks in each subsequent collision interval.

The scheduler may determine the communication behavior by determining the time spent by the network device in each of the communication networks based on the monitored traffic, such as on the communication statistics. Thus, the scheduler may schedule the network device to spend a larger portion of the collision interval time in the communication network that communicates more data to the network device.

The scheduler may determine the communication behavior by disabling transmission of data by the network device during the collision intervals. Thus, the scheduler may schedule the network device to receive communication during the collision intervals. The flow then proceeds to operations 1008 and 1010.

At operation 1008, the scheduler communicates availability of the network device in the first communication network to the first communication network. At operation 1010, the scheduler communicates availability of the network device in the second communication network to the second communication network. The scheduler may communicate portions of the combined schedule, such as the availability of the network device or a sleep schedule of the network device over each of the communication networks.

The scheduler may communicate a different portion of the combined schedule over each of the communication networks. Each portion of the combined schedule may indicate times during which the network device is available for communication over a given communication network. With reference to FIG. 9, the scheduler may communicate the FCN schedule 904 over the first communication network and the SCN schedule 906 over the second communication network. For example, a schedule may include a PLC schedule and a Wi-Fi schedule. The PLC schedule indicates times during which the network device is available to communicate over the PLC communication network. The Wi-Fi schedule indicates times during which the network device is available to communicate over the Wi-Fi communication network.

In one embodiment, the scheduler may communicate a respective sleep schedule over each of the communication networks. The scheduler may communicate, over the first communication network, the times at which the network device will enter a sleep state, such as the time instances 952, 954, and 956 of the FCN schedule 904. The scheduler may also communicate the duration of each NDU time period 938, 940, and 942 as sleep intervals. Alternatively or in addition to, the scheduler may communicate the time instances 946, 950, and 958, respectively, at which each of the sleep intervals ends. The scheduler 126 may communicate to the second communication network the times at which the network device will enter a sleep state, such as the time instances 978, 990, 992, 994, and 995 of SCN schedule 906. The scheduler may also communicate a duration of each SCNU time period 968, 970, 972, 974, and 976 as sleep intervals. Alternatively or in addition to, the scheduler may communicate the time instances 980, 984, 986, 988, and 996, respectively, at which each of the sleep intervals ends. In one embodiment, the scheduler may communicate a separate indication of each of the sleep intervals at the beginning of each sleep interval, i.e., at time instances 952, 954, and 956 of the FCN schedule 904 over the first network, and at time instances 978, 990, 992, 994, and 995 of the SCN schedule 906 over the second network. After both operations 1008 and 1010, the flow continues at operation 1012.

At operation 1012, the scheduler determines whether to adjust the combined schedule. If the scheduler determines to adjust the combined schedule, the flow continues to operation 1002. If the scheduler determines not to adjust the combined schedule, the flow continues to operation 1014. The scheduler may determine to adjust the combined schedule based on a variety of factors, such as based on a change in the monitored traffic, such as on the communication statistics. The scheduler may adjust the combined schedule to favor the communication network that has higher traffic. For example, the scheduler may adjust the combined schedule to meet constraints of the communication network with the higher traffic. For example, with reference to FIG. 9, the scheduler may adjust the combined schedule 902 such that the network device is available for communication over the second communication network for longer time intervals.

The scheduler may also adjust the combined schedule 902 to reduce the duration of the collision interval 998 (as compared to the duration of the collision interval 997). The scheduler may also adjust the combined schedule 902 such that there is no collision interval during the FCNA time period 914 and SCNA time period 922. However, it is noted that due to various constraints, including network traffic and the periodicity of the communication networks, subsequent collision intervals may be inevitable. In some instances, even though the monitored traffic has changed, the scheduler may determine to adjust the collision interval instead of adjusting the combined schedule. For example, the scheduler may determine that due to the constraints, the combined schedule should not be changed, and instead change the communication behavior of the network device during the collision intervals.

At operation 1014, the scheduler determines whether to adjust the communication behavior of the network device during the collision interval. If the scheduler determines to adjust the communication behavior of the network device during the collision interval, the flow continues to operation 1004. If the scheduler determines not to adjust the communication behavior of the network device during the collision interval, the flow ends. The scheduler may make this determination based on a variety of factors, such as based on a number of collisions during each of the collision intervals. For example, if the network device is disconnected from the second communication network due to the network device not being responsive during one of the collision intervals, the scheduler may determine that numerous collisions occurred in the second communication network. The scheduler may also factor in the communication statistics. For example, the scheduler may adjust the collision interval to favor the communication network that has higher traffic.

As will be appreciated in light of the disclosure, the flow diagrams of FIGS. 6-8 and 10 may be modified in order to derive alternative aspects of the disclosure. Also, some operations in this aspect of the disclosure are shown in sequential order. However, certain operations may occur in a different order than shown, certain operations may be performed concurrently, certain operations may be combined with other operations, and certain operations may be absent in another aspect of the disclosure.

As will be appreciated by one skilled in the art, aspects of the present disclosure may be embodied as a system, method, or computer program product. Accordingly, aspects of the present disclosure may take the form of a hardware embodiment, a software embodiment (including firmware, resident software, micro-code, etc.) or an embodiment combining software and hardware aspects that may all generally be referred to herein as a "circuit," "module," "unit," or "system." Furthermore, aspects of the present disclosure may take the form of a computer program product embodied in one or more non-transitory computer-readable medium(s) having computer-readable program code embodied thereon.

The described embodiments may be provided as a computer program product, or software, that may include a non-transitory machine-readable medium having stored thereon instructions, which may be used to program a computer system (or other electronic device(s)) to perform a process according to embodiments, whether presently described or not, since every conceivable variation is not enumerated herein. A non-transitory machine-readable medium includes any mechanism for storing or transmitting information in a form (e.g., software, processing application) readable by a machine (e.g., a computer). The non-transitory machine-readable medium may include, but is not limited to, magnetic storage medium (e.g., floppy diskette); optical storage medium (e.g., CD-ROM); magneto-optical storage medium; read-only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communication medium.

Computer program code for carrying out operations of the embodiments may be written in any combination of one or more programming languages, including an object oriented programming language such as Java, Smalltalk, C++, and procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Aspects of the present disclosure are described with reference to flowchart illustrations and/or diagrams of methods, apparatus (systems) and computer program products according to embodiments of the disclosure. It will be understood that each operation of the flowchart illustrations and/or block diagrams, and combinations of operation in the flowchart illustrations and/or diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or diagram operation(s).

These computer program instructions may also be stored in a non-transitory computer-readable medium that may direct a computer, other programmable data processing apparatus, or other devices to function in a particular manner, such that the instructions stored in the non-transitory computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
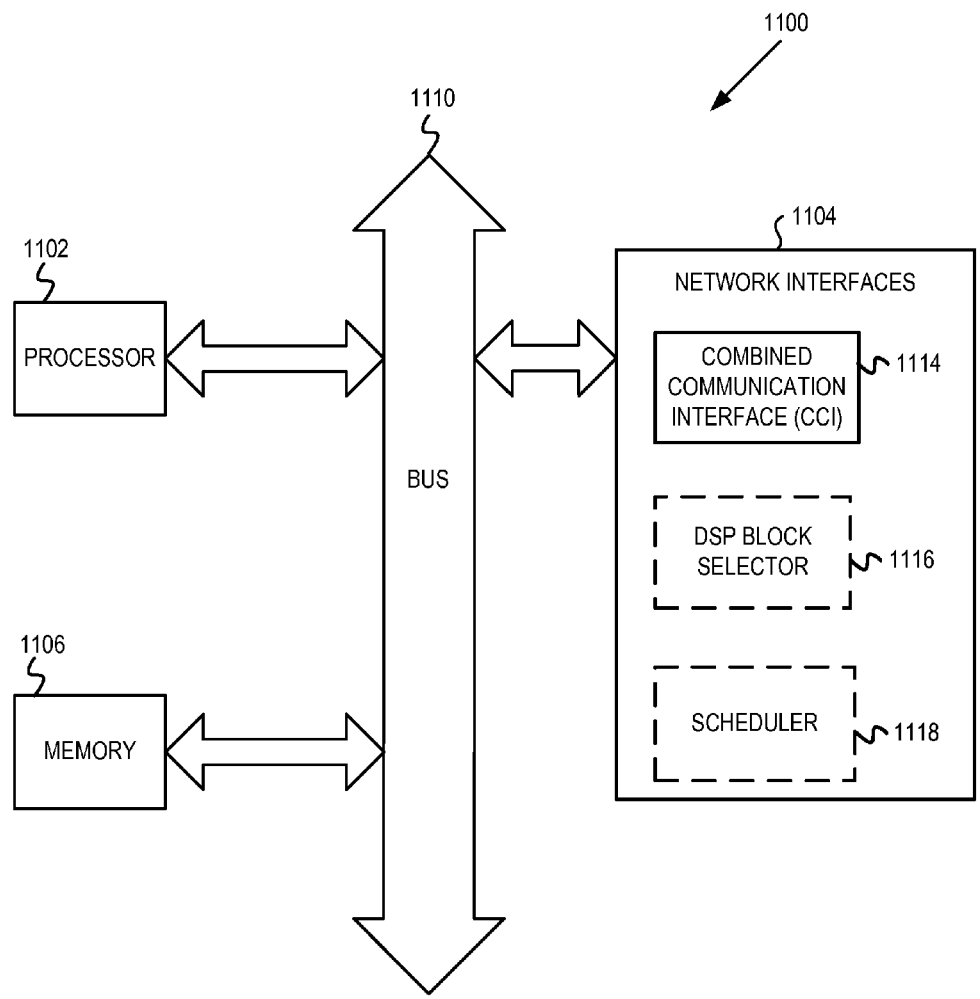
FIG. 11 is a diagram of an embodiment of an electronic device including an interface for network communications.

FIG. 11 is a diagram of an embodiment of an electronic device including an interface for network communications. The network device 1100 may implement the functionalities and perform the operations describe above in FIGS. 1-10. The network device 1100 includes a processor 1102 (including multiple processors, multiple cores, multiple nodes, and/or implementing multi-threading, etc.). The computer system includes memory 1106. The memory 1106 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of non-transitory machine-readable media. The network device 1100 also includes a bus 1110 (e.g., PCI, ISA, PCI-Express, HyperTransport®, InfiniBand®, NuBus, etc.). The network device 1100 also includes network interfaces 1104 that include at least one of a wireless network interface (e.g., a Wireless Local Area Network (WLAN) interface, a Bluetooth® interface, a WiMAX interface, a ZigBee® interface, a Wireless Universal Serial Bus (USB) interface, etc.) and a wired network interface (e.g., a PLC interface, an Ethernet interface, etc.). The network interfaces may include a combined communication interface (CCI) 1114, a DSP block selector 1116 and a scheduler 1118. In some embodiments, the network interfaces 1104, the processor 1102, and the memory 1106 may implement the functionalities described above in FIGS. 1-10. For example, the network interfaces 1104, the processor 1102, and the memory 1106 may implement the functionalities of the DSP block selector 1116 and/or the scheduler 1118.

The memory 1106 may embody functionality to implement embodiments described above. The memory 1106 may include one or more functionalities that facilitate communication over multiple communication networks. It is further noted that any one of these functionalities may be partially (or entirely) implemented in hardware and/or on the processor 1102. For example, the functionality may be implemented with an application specific integrated circuit, in logic implemented in the processor 1102, in a co-processor on a peripheral device or card, etc. Further, realizations may include fewer or additional components not illustrated in FIG. 11 (e.g., video cards, audio cards, additional network interfaces, peripheral devices, etc.). The processor 1102, the memory 1106, and the network interfaces 1104 are coupled to the bus 1110. Although illustrated as being coupled to the bus 1110, the memory 1106 may be coupled to the processor 1102.

While the embodiments are described with reference to various implementations and exploitations, it will be understood that these embodiments are illustrative and that the scope of the subject matter is not limited to them. In general, techniques for facilitating communication over multiple communication networks as described herein may be implemented with facilities of hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the subject matter.

What is claimed is:

1. A method for using a network device to communicate over multiple communication networks, the method comprising:
receiving a packet from a combined communication interface;
determining whether the packet is formatted according to a first communication protocol or a second communication protocol;
in response to determining that the packet is formatted according to the first communication protocol, enabling a first component in a first digital signal processor (DSP) block of the network device to process the packet according to the first communication protocol, disabling a second component of the first DSP block, wherein the second component is configured to process packets according to the second communication protocol, determining a configuration parameter associated with the first communication protocol for a second DSP block of the network device, the second DSP block configurable to process packets according to the first communication protocol or the second communication protocol, and configuring, using the configuration parameter, the second DSP block for further processing the packet according to the first communication protocol.

2. The method of claim 1, further comprising:
determining one or more additional DSP blocks for propagating the packet through the network device; and
configuring the one or more additional DSP blocks to process the packet according to the first communication protocol.

3. The method of claim 1, wherein said determining whether the packet is formatted according to the first communication protocol or the second communication protocol comprises:
propagating the packet through a third DSP block and a fourth DSP block to determine whether the packet is formatted according to the first communication protocol or the second communication protocol, wherein
the third DSP block is for processing the packet according to the first communication protocol, and
the fourth DSP block is for processing the packet according to the second communication protocol.

4. The method of claim 3, wherein
said propagating the packet through the third DSP block and the fourth DSP block is performed in parallel.

5. The method of claim 1, wherein
in response to determining that the packet is formatted according to the second communication protocol,
disabling the first component in the first DSP block of the network device,
enabling the second component of the first DSP block to process the packet according to the second communication protocol,
determining a second configuration parameter associated with the second communication protocol for the second DSP block of the network device, and
configuring, using the second configuration parameter, the second DSP block for further processing the packet according to the second communication protocol.

6. The method of claim 1, wherein
said determining that the packet is formatted according to the first communication protocol is based, at least in part, on a schedule.

7. The method of claim 1, further comprising:
in response to determining that the packet is formatted according to the first communication protocol, determining whether to configure the second DSP block using the configuration parameter or by enabling a first component of the second DSP block.

8. The method of claim 1, wherein
the network device is available for communication over a Powerline Communication (PLC) communication network using the first communication protocol, and
the network device is available for communication over a Wi-Fi communication network using the second communication protocol.

9. A network device comprising:
a combined communication interface (CCI) configured to receive first packets over a first communication network and second packets over a second communication network;
a first digital signal processor (DSP) block coupled to the CCI, wherein the first DSP block comprises,
a first component configured to process the first packets according to a first communication protocol, and
a second component configured to process the second packets according to a second communication protocol;
a second DSP block coupled to the first DSP block, wherein the second DSP block is configurable to process the first packets according to the first communication protocol or process the second packets according to the second communication protocol; and
a DSP block selector coupled to the CO, to the first DSP block, and the second DSP block, wherein the DSP block selector is configured to,
determine whether a packet received via the CCI is formatted according to a first communication protocol or a second communication protocol,
in response to a determination that the received packet is formatted according to the first communication protocol,
disable the second component of the first DSP block and enable the first component of the first DSP block to process the received packet according to the first communication protocol,
determine a configuration parameter associated with the first communication protocol for the second DSP block, and
configure, using the configuration parameter, the second DSP block for further processing the received packet according to the first communication protocol.

10. The network device of claim 9, wherein the DSP block selector is further configured to,
determine one or more additional DSP blocks for propagating the received packet through the network device, and
configure the one or more additional DSP blocks to process the received packet according to the first communication protocol.

11. The network device of claim 9, wherein the DSP block selector is further configured to,
propagate the received packet through a third DSP block and a fourth DSP block, wherein
the third DSP block is configured to process the received packet according to the first communication protocol, and
the fourth DSP block is configured to process the received packet according to the second communication protocol.

12. The network device of claim 11, wherein the DSP block selector is further configured to determine that the received packet is formatted according to the first communication protocol based, at least in part, on propagating the received packet through the third DSP block and the fourth DSP block prior to propagating the packet through the first component of the first DSP block and through the second DSP block.

13. The network device of claim 11, wherein propagation of the received packet through the third DSP block and the fourth DSP block occurs in parallel.

14. The network device of claim 9, wherein the DSP block selector is further configured to determine that the received packet is received using the first communication protocol based, at least in part, on a schedule.

15. The network device of claim 9, wherein the DSP block selector is further configured to,
in response to determining that the received packet is formatted according to the first communication protocol, determine whether to configure the second DSP block using the configuration parameter or by enabling a first component of the second DSP block.

16. The network device of claim 9, wherein
the network device is available for communication over a Powerline Communication (PLC) communication network using the first communication protocol, and
the network device is available for communication over a Wi-Fi communication network using the second communication protocol.

17. A network device comprising:
means for receiving a packet from a combined communication interface of the network device;
means for determining whether the packet is formatted according to a first communication protocol or a second communication protocol;
in response to determining that the packet is formatted according to the first communication protocol,
means for enabling a first component of a first digital signal processor (DSP) block to process the packet according to the first communication protocol;
means for disabling a second component of the first DSP block, wherein the second component is configured to process packets according to the second communication protocol;
means for determining a configuration parameter associated with the first communication protocol for a second DSP block, the second DSP block configurable to process packets according to the first communication protocol or the second communication protocol; and
means for configuring, using the configuration parameter, the second DSP block for further processing the packet according to the first communication protocol.

18. The network device of claim 17, further comprising:
means for determining one or more additional DSP blocks for propagating the packet through the network device; and
means for configuring the one or more additional DSP blocks to process the packet according to the first communication protocol.

19. The network device of claim 17, wherein said means for determining whether the packet is formatted according to the first communication protocol or the second communication protocol comprises:
means for propagating the packet through a third DSP block and a fourth DSP block to determine whether the packet is formatted according to the first communication protocol or the second communication protocol, wherein
the third DSP block is for processing the packet according to the first communication protocol, and
the fourth DSP block is for processing the packet according to the second communication protocol.

20. The network device of claim 19, wherein
the means for propagating the packet through the third DSP block and the fourth DSP block propagate the packet through the third DSP block and the fourth DSP block in parallel.

21. The network device of claim 19, wherein
in response to determining that the packet is formatted according to the second communication,
means for disabling the first component in the first DSP block of the network device,
means for enabling the second component of the first DSP block to process the packet according to the second communication protocol,
means for determining a second configuration parameter associated with the second communication protocol for the second DSP block of the network device, and
means for configuring, using the second configuration parameter, the second DSP block for further processing the packet according to the second communication protocol.

22. The network device of claim 17, wherein
the means for determining that the packet is formatted according to the first communication protocol is based, at least in part, on a schedule.

23. A network device configured to communicate over multiple communication networks, the network device comprising:
a processor;
a non-transitory computer-readable medium including instructions that, when executed on the processor, cause the processor to perform operations for processing communications from the multiple communications networks, the instructions including instructions to,
receive a packet from a combined communication interface;
determine whether the packet is formatted according to a first communication protocol or a second communication protocol;
in response to determination that the packet is formatted according to the first communication protocol,
enable a first component in a first digital signal processor (DSP) block of the network device to process the packet according to the first communication protocol,
disable a second component of the first DSP block, wherein the second component is configured to process packets according to the second communication protocol,
determine a configuration parameter associated with the first communication protocol for a second DSP block of the network device, the second DSP block configurable to process packets according to the first communication protocol or the second communication protocol, and
configure, using the configuration parameter, the second DSP block for further processing the packet according to the first communication protocol.

24. The network device of claim 23, wherein the instructions further to:
determine one or more additional DSP blocks for propagating the packet through the network device; and
configure the one or more additional DSP blocks to process the packet according to the first communication protocol.

25. The network device of claim 23, wherein the instructions to determine whether the packet is formatted according to the first communication protocol or the second communication protocol further include instructions to:
  propagate the packet through a third DSP block and a fourth DSP block to determine whether the packet is formatted according to the first communication protocol or the second communication protocol, wherein
    the third DSP block is for processing the packet according to the first communication protocol, and
    the fourth DSP block is for processing the packet according to the second communication protocol.

26. The network device of claim 25, wherein propagation of the packet to the third DSP block and the fourth DSP block occurs in parallel.

* * * * *